United States Patent [19]

Greenberg

[11] Patent Number: 5,519,356
[45] Date of Patent: May 21, 1996

[54] METHODS AND APPARATUSES FOR FAST DECISION DIRECTED CARRIER RECOVERY WITH WIDE LOCKING RANGE

[75] Inventor: Craig B. Greenberg, Sunnyvale, Calif.

[73] Assignee: National Semiconductor Corporation, Santa Clara, Calif.

[21] Appl. No.: 499,380

[22] Filed: Jul. 7, 1995

Related U.S. Application Data

[63] Continuation-in-part of Ser. No. 387,185, Feb. 13, 1995, abandoned.

[51] Int. Cl.$^6$ .............................. H03D 3/00; H04L 27/233
[52] U.S. Cl. ..................... 329/304; 329/307; 329/310; 375/261; 375/324; 375/327; 375/344
[58] Field of Search ....................................... 329/304–310; 375/261–266, 279–284, 324–333, 344

[56] References Cited

U.S. PATENT DOCUMENTS

| | | | |
|---|---|---|---|
| 5,343,499 | 8/1994 | Jasper et al. ................. | 375/261 |
| 5,386,202 | 1/1995 | Cochran et al. ................ | 332/100 |
| 5,471,508 | 11/1995 | Koslov ......................... | 375/344 |

OTHER PUBLICATIONS

John A. C. Bingham, "The Theory And Practice Of Modem Design", John Wiley & Sons, Apr. 19, 1988, pp. 181–188.
Neil K. Jablon, "Joint Blind Equalization, Carrier Recovery, and Timing Recovery For High-Order QAM Signal Constellations", IEEE Transactions on Signal Processing, vol. 40, No. 6, Jun. 1992, pp. 1383–1397.
P. Herbig, "A New Acquisition Technique For Carrier Recovery With QAM Signals", Radio Relay Systems, Conference Publication No. 386, IEE, 11–14 Oct. 1993, pp. 316–321.

*Primary Examiner*—David Mis
*Attorney, Agent, or Firm*—Limbach & Limbach

[57] ABSTRACT

In quadrature amplitude modulation, circular concentric decision regions capitalize on the observation that when the sample matrix is rotating, it is possible to identify samples more accurately by the radius of their orbit rather than their phase at any given time. The first embodiment provides that a scalar $1_i$ is calculated for each constellation point so that the constellation point corresponding to the minimum $1_i$ value is the symbol which the decision device decides was transmitted. The nearest constellation point having the minimum magnitude difference represents the decision. In the second embodiment, two complementary weighting factors are used to provide a weighted average of the two decision criteria in order to make the correct decision. $\alpha$ is the weight for representing standard rectangular decision regions, while $(1-\alpha)$ is the weight for representing the circular decision regions. The range for $\alpha$ is $0 < \alpha \leq 1$. The variable $\alpha$ according to the present invention balances the effects of white noise versus constellation rotation. A carrier lock detection circuit is used to adjust $\alpha$. When unlocked a low $\alpha$ near zero is used; when locked a high $\alpha$ at or near one is used. One alternative to running the calculations for each viable candidate constellation point $q_i$ is to use a lookup table. Quantizing the input to a reasonable level and supporting a small number of $\alpha$ levels obtains most of the benefit of the present invention at a reasonable cost. A combination of computation and storage balances the use processing and storage requirements.

42 Claims, 22 Drawing Sheets

METHODS AND APPARATUSES FOR FAST DECISION DIRECTED CARRIER RECOVERY WITH WIDE LOCKING RANGE

RELATED APPLICATIONS

This is a Continuation-In-Part of U.S. patent application Ser. No. 08/387,185 filed Feb. 13, 1995, abandoned, and entitled "FAST DECISION DIRECTED CARRIER RECOVERY WITH WIDE LOCKING RANGE" (the disclosure of which is incorporated herein by reference).

BACKGROUND OF THE INVENTION

1. Field of the Invention

The present invention relates to the field of decision devices for quadrature amplitude modulation. Specifically, the invention addresses the need for accurate decision making before the receiver has locked onto the correct carrier frequency.

2. Description of the Related Art

Quadrature amplitude modulation (QAM) is a method for sending two independent signals simultaneously over the same frequency channel. A simple block diagram for this process is shown in FIG. 1. The modulator 12 converts x(t) and y(t) into z(t) by multiplying x(t) by $\cos 2\pi f_{ct} t$ and y(t) by $\sin 2\pi f_{ct} t$. Here, $f_{ct}$ is the transmitter modulation frequency. The demodulator 13 converts z(t) back into x(t) and y(t) by multiplying by $\cos 2\pi f_{cr} t$ and $\sin 2\pi f_{cr} t$. Here, $f_{cr}$ is the receiver demodulation frequency. The signals x(t) and y(t) can be plotted along the x-axis and y-axis of a cartesian coordinate system. If this coordinate system is taken to be the complex plane, then x(t) is the real part and y(t) is the imaginary part of a complex signal.

For the transmission of digital signals over analog transmission media 10, quadrature amplitude modulation permits a finite number of discrete points in the complex plane to correspond to digital numbers or symbols. FIG. 2 shows an example of one possible set of points. Each point represents a symbol in the digital alphabet which can be transmitted. The set of points is called a constellation. Quadrature amplitude modulation generally uses rectangular constellations, where the points are in a rectangular lattice. The constellations are classified according to the number of bits M per symbol that they can convey. In order to convey M bits, the number of points in the constellation is $2^M$. In FIG. 2 M=7, thus there are 128 points in the constellation. FIG. 3 shows a rectangular constellation where M=6. As is demonstrated by FIG. 3, when M is equal to an even number, the constellation is square. One advantage to having a square constellation is that half of the encoded bits are represented by the value along the x-axis, while the other half are represented by the value along the y-axis. Therefore, the coder in the transmitter for such a square constellation can be constructed as shown in FIG. 5, where the generation of x(t) and y(t) are independent of each other. In practice, x(t) and y(t) may not be coded independently even if the constellation is square, but only square constellations allow such independence to be exploited if desired. FIG. 5 shows the binary input 50 being separated into two independent streams of data 51 which can be independently converted into x(t) and y(t) by the analog to digital converters 52. Because each symbol is represented by M bits, a binary input rate of R bits per second corresponds to the symbol rate of R/M symbols per second. In FIG. 4, the first and third bits of each four bit symbol represent the position along the y-axis, and the second and fourth bits represent the position along the x-axis. However, if M is equal to an odd number, then the generation of x(t) and y(t) are dependent upon each other, thus requiring a slightly more complicated coder.

A standard receiver recovery system using an analog voltage-controlled oscillator (VCO) 60 is shown in FIG. 6. (FIG. 7 shows an equivalent system using a numerically controlled oscillator (NCO) 70 in which all feedback functions are performed in the digital domain. Because the discussion applies equally well to both types of systems with only minor obvious variations, for the sake of brevity, the systems will only be described with reference to FIG. 6 in which a VCO 60 is used.) An analog signal z(t) comes from a receiver (not shown), and is multiplied using complex multiplier 61 by $\cos 2\pi f_{cr} t$ and $\sin 2\pi f_{cr} t$ which are generated by the VCO 60. The VCO 60 is designed to oscillate at a certain frequency $f_{cr}$ which is an estimate of carrier frequency. This frequency $f_{cr}$ may not exactly be equal to the correct modulation frequency $f_{ct}$. For example, in the case that the modulation frequency estimate is not derived by the receiver, the transmitter oscillator may have been slightly off, or slight frequency shifting may have occurred during transmission. In the case that the receiver derives its estimate of the modulation frequency $f_{ct}$ from the received signal, it is impossible to derive the correct frequency with the precision necessary for correct demodulation. In any case, the receiver's VCO 60 must be adjusted to exactly match the actual modulation frequency $f_{ct}$. The VCO 60 has a certain gain such that an applied voltage to its input causes its oscillation frequency $f_{cr}$ to be adjusted by a corresponding number of hertz per volt.

Upon initially attempting to demodulate the input signal z(t), the oscillator frequency $f_{cr}$ is likely to differ from the actual modulation frequency $f_{ct}$. If the two outputs of the VCO 60 are viewed as the real and imaginary parts of a complex signal, that signal has a constant magnitude, and a constant rate $2\pi f_{cr}$ of phase change. When z(t) is multiplied by the complex VCO 60 output, a complex analog signal is produced. The separate real part and imaginary part of the complex analog signal are converted into a complex digital signal by the analog to digital converter 62. This signal is then filtered by an equalizer 63 to compensate the non-ideal impulse response of the transmission and to filter out the undesired high-frequency bands (as done by the low pass filters 11 in FIG. 1) resulting from the multiplications. If the VCO 60 frequency $f_{cr}$ is exactly the correct modulation frequency $f_{ct}$, then the real part of the equalizer output is x(t) and the imaginary part is y(t) so that correct and successful demodulation down from the carrier frequency $f_{ct}$ has been performed.

Using one of a variety of methods, a tone oscillating at the transmission symbol rate (R/M in FIG. 5) is recovered from the input signal z(t). Using a phase locked loop (not shown), the correct phase of the tone is determined to indicate when, during each period of the tone, to sample x(t) and y(t). A sampling clock is generated and fed into the decision device 64. Directed by the sampling clock, the decision device samples x(t) and y(t). Each sample taken represents a point in the complex plane. If the system is correctly demodulating z(t), and if no noise has distorted the signal in transmission, the sampled point will land exactly on one of the points of the constellation. In the likely event that noise has distorted the signal at some point in the system, the sampled point will not land exactly on one of the constellation points. If random white noise is assumed, a guassian distribution with samples centered around each constellation point will be produced as illustrated in FIG. 8.

Using some decision criteria, the decision device 64 determines which symbol was transmitted for each sample. Once the determination has been made as to which symbol was transmitted, the decision device outputs those bits representative of the determined symbol. The standard rectangular decision regions are shown in FIGS. 8 and 9.

Assuming no noise (for the sake of simplicity), if the VCO 60 demodulation frequency $f_{cr}$ does not exactly match the modulation frequency $f_{ct}$, then the samples that are taken will not land on the constellation points; rather the rectangular matrix of samples will spin at a rate equal to the difference in the two modulation frequencies ($f_{ct}$–$f_{cr}$) as illustrated in FIG. 9. If the matrix of samples is spinning relative to the constellation of symbols, it will be difficult if not impossible for the decision device to make the correct decisions; thus, symbols will be misinterpreted, and incorrect data will be output. As illustrated in FIG. 9, most of the sample points 90 land in the wrong decision regions, and thus incorrect data is output. Only the inner points 91 landed in the correct decision regions. FIG. 9 shows the phase error $\phi$ associated with this grouping of samples.

When the matrix of samples is spinning, the system is not locked onto the correct carrier frequency. In order to lock onto the carrier frequency, the system must be able to adjust the VCO 60 demodulation frequency $f_{cr}$ so as to converge onto the correct modulation frequency $f_{ct}$. Proper adjustment of the VCO 60 frequency begins by calculating the phase error $\phi$ of some or all of the sample points. The phase error $\phi$ for a correctly translated symbol is illustrated in FIG. 10. The translated symbol 100 has a real part of +5 and an imaginary part of +5i. The sample point 101 which was detected has a slightly larger real part and a slightly lower imaginary part; however, the sample points still fell within the correct decision region 102 of the complex plane 103. The decision device has determined which symbol q 100 was transmitted. The sample point x 101 which is actually detected lies somewhere in the complex plane 103. The phase error $\phi$ is computed by the phase measuring unit 65 according to the following equation in which $\bar{x}$ represents the complex conjugate of x.

$$\phi = Im\ [\bar{x}^*q/|q|^2], \text{ where}$$

$\phi$ times $\pi/2$ converts the phase error $\phi$ into units of radians. The computed phase errors are delivered to a loop filter 66 such as illustrated in FIG. 11. The loop filter 66 essentially accumulates (or integrates) the calculated phase errors over time. If the accumulator gain $K_I$ of amplifier 110 is less than the direct input gain $K_D$ of amplifier 111, more weight is given to the presently calculated phase error $\phi$ and less weight to the accumulated phase errors. The digital output of the loop filter V is converted into an analog signal by a digital to analog converter 67 and is supplied to the VCO 60 so as to adjust the demodulation frequency $f_{cr}$ toward the modulation frequency $f_{ct}$.

However, when the system is not locked, the decision device 64 will not be detecting the correct symbols very often. The phase error measurements will therefore be meaningless. Since the correct symbol is not detected, the correct phase error $\phi$ will not be known. As long as the decision device 64 is not detecting the correct symbols, the phase errors calculated will essentially be random numbers with a zero mean. Because the random phase errors have a zero mean, their integral over time will be zero, and the correction value supplied to the VCO 60 will be bouncing up and down in correspondence with the current phase error measurement so that the system is not converging onto the correct demodulation frequency $f_{ct}$.

As the sample matrix rotates around, at some time it will rotate into the correct position so that correct decisions are made for a brief time. When this happens, if the rate of rotation of the sample matrix ($f_{ct}$–$f_{cr}$) is much lower than the symbol rate (R/M), then several phase error measurements directly in sequence will have the same sign (and approximate magnitude), supplying a steady correction value V through the direct input $K_D$ 111. The integral of the measurements will accumulate at register C 112 to a non-zero value in the loop filter 66. When the proper correction voltage V is supplied to the VCO 60, the phase error measurements will become zero, and the accumulated value at register C 112 will maintain the proper correction voltage through the amplifier $K_I$ 110.

The non-zero values supplied to the VCO 60 will adjust the frequency of the VCO 60 slightly closer to the correct modulation frequency. When the VCO 60 frequency is closer to the correct modulation frequency, the sample matrix will spin at a slower rate. If the loop filter 66 accumulates the correct adjustment value, the system will lock onto the constellation, and the sample matrix will cease spinning. When the system is locked, the phase error measurements will become very close to zero, and the correction voltage V supplied to the VCO 60 will be dominated by the accumulated value in register C 112.

The maximum modulation frequency error range over which the system can lock is the locking bandwidth or locking range of the system. There are at least two reasons why the system may not be able to lock. First, if the VCO 60 frequency $f_{cr}$ is too far away from the carrier modulation frequency $f_{ct}$, the sample matrix will be spinning at a high rate. Even if all decisions made by the decision device 64 were correct, the measured phase error angle $\phi$ computed for each sample would be varying sinusoidally at the same high rate. If gain $K_D$ of the direct input amplifier 111 in the loop filter 66 is not sufficiently high, the correction voltage V supplied to the VCO 60 will be too small to correct the frequency error. The accumulator 113 will not have time to accumulate a non-zero value either. Thus, the correction value will have zero mean.

The system will only lock when the rate of rotation is low enough such that the loop filter 66 will accumulate the appropriate correction value. This maximum rate of rotation which the loop filter 66 can correct represents the loop filter bandwidth. If the decision device 64 always makes the correct decision during the locking process, the loop filter bandwidth is monotonically related to the locking bandwidth of the system.

However, if the system is not locked, the decision device 64 can only consistently make the correct decisions if the transmitter (not shown) is sending out some predetermined training sequence. Therefore, the second reason why the system may not be able to lock is that, in the absence of a specially transmitted training sequence, the decision device 64 will only be making the correct decisions during a very small portion of the sample matrix's rotation. Only during the portion of rotation where each sample happens to be closest to the correct symbol in the constellation will the correct decisions be made. These correct decisions are only made for certain rotational angle ranges. For instance, in FIG. 9, $\phi$ is too large so that all the decisions for samples 90 are incorrect. When larger constellations are used, the angle during which the sample points are nearest the correct symbol in the constellation become correspondingly smaller. Since the system can only lock during the time in which the correct decisions are being made, the locking bandwidth of the system is the loop filter bandwidth multiplied by the fraction of the circle during which the correct decisions are made. With large constellations, the angle during which lock can occur becomes very small, and the system can only recover from very small modulation-demodulation frequency mismatches ($f_{cr}-f_{ct}$).

Prior art methods for increasing the locking bandwidth include widening the bandwidth of the loop filter 66, sweeping the VCO 60 frequency, and the use of corner points based algorithms. Each of these methods has particular problems and limitations.

Widening the bandwidth of the loop filter 66 will improve the lock range. This is accomplished by increasing the gain $K_D$ 111 of the present phase angle error measurement in the loop filter 66. This gain increase essentially increases the supplied adjustment value V due to the last measured phase error φ The loop filter 66 will adapt very quickly to measured phase errors.

However, this approach will increase the jitter. Jitter is caused by the system mistakenly adapting from the correct demodulation frequency $f_{ct}$ to an incorrect demodulation frequency. When the system is properly locked, the sample matrix will still not exactly match the constellation locations. Because of random noise incurred in transmission, sample points will be distributed around the constellation points. If the bandwidth of the loop filter 66 is too great, the system will change the demodulation frequency $f_{cr}$ due to each measured phase error φ. Thus, random noise will cause the system to mistakenly adapt and thereby unlock more easily. To reduce jitter, one prior art method provides a carrier lock detection circuit to adjust the parameters of the loop filter 66 so as to narrow the bandwidth of the loop filter 66 when the system is locked. As described above, the basic problem with this method is that the decision directed phase detector information degrades as the rotational angle increases. For high QAM systems such as 64 or 256 QAM, the angle over which the decision directed phase detector 65 gives accurate information is very small. This small angle limits the locking bandwidth.

A second prior art approach is sweeping the demodulation frequency $f_{cr}$, as illustrated by FIG. 12. To sweep the demodulation frequency $f_{cr}$, a separate additional input term to adder 114 in the loop filter 66 is added to adjust the register C 112. The bandwidth of the loop filter 66 is not increased by this; rather the VCO 60 frequency $f_{cr}$ is methodically increased and decreased (swept) such as shown by arrow 120 over a wide frequency range centered around the initial estimated frequency $f_{est}$ until the correct demodulation frequency $f_{ct}$ is brought within the loop filter bandwidth $f_{LFB}$. When the system detects that it is locked, the sweeping processed is turned off, and the loop filter 66 degenerates into the one shown in FIG. 11.

There are several disadvantages to this procedure. Sweeping the demodulation frequency $f_{cr}$ is a slow process. Constant sweeping will degrade bit error rate performance since the system will produce many errors during the lengthy period of sweeping. This method is also very sensitive to the carrier lock detect circuitry. A false lock detect will cause the system to stabilize in an unlocked condition. A false unlock detect will initialize sweeping which may cause loss of lock and will at minimum degrade bit error rate performance while sweeping.

Another prior art approach involves using only the corner points to detect locking. Corner point detection increases the angle of rotation during which lock can occur. As shown in FIG. 13, a magnitude threshold 130 is chosen so that only the four corner constellation points 131 are above the magnitude threshold 130. This approach is effective for small constellations but becomes increasing ineffective in larger constellations for two reasons. The first problem is that constellation points are closer together for larger constellations, and thus noise pushes those points close to the corner points outside the threshold more frequently. These points are then mistaken for the corner points 131, and inaccurate phase error measurements result. The second problem is that the four corner points 131 represent a smaller percentage of the total points when the number of total points becomes large. If a random distribution of transmitted points is assumed, then corner symbols 131 are transmitted less frequently in larger constellations. These two factors translate into a much noisier phase measurement, and thus adversely affect the ability to gain and maintain lock.

SUMMARY OF THE INVENTION

When a quadrature amplitude modulation receiver system is locked onto the carrier frequency $f_{ct}$, white noise is the sole source of error. In this case, the standard rectangular decision regions produce the fewest number of errors.

However, when the carrier is not locked, a decision device based upon rotation of the constellation points is best. Thus, circular concentric decision regions capitalize on the observation that when the sample matrix is rotating, it is possible to identify samples more accurately by the radius of their orbit rather than their phase at any given time.

According to the present invention, to make each decision, a scalar $l_i$ is calculated for each constellation point so that the constellation point corresponding to the minimum $l_i$ value is the symbol which the decision device decides was transmitted. The nearest constellation point having the minimum magnitude difference represents the decision.

According to a second embodiment of the present invention, two complementary weighting factors are used to provide a weighted average of the two decision criteria in order to make the correct decision. α is the weight for representing standard rectangular decision regions, while (1−α) is the weight for representing the circular decision regions. The range for α is 0<α<1.

According to the present invention, the variable α balances the effects of white noise versus constellation rotation. Accurate decision making is important before locking occurs because, in the absence of a training sequence, the rotational phase range during which locking can occur is limited to the range during which the decision device can make accurate decisions.

According to the present invention, a carrier lock detection circuit is used to adjust α. When unlocked, a low α nearer to zero is used; when locked, a high α at or near one is used. In practice, when locked, the decision regions may become completely or almost completely square. When unlocked, the decision regions will become more circular, but not completely circular. This retains the benefits of each decision system without incurring the penalties.

According to one aspect of the present invention, one alternative to running the calculations for each viable candidate constellation point $q_i$, is to use a lookup table. Quantizing the input to a reasonable level and supporting a small number of α levels obtains most of the benefit of the present invention at a reasonable cost. In one extreme, all the calculations can be performed from scratch for each sample point. In the opposite extreme, the above-described lookup table approach can be used so that all the necessary computations have been precalculated and the final decisions are stored in the ROM. According to the present invention, a combination of the above two methods can also exist that balances the use of processing and storage.

DETAILED DESCRIPTION OF THE INVENTION

Figure 14:
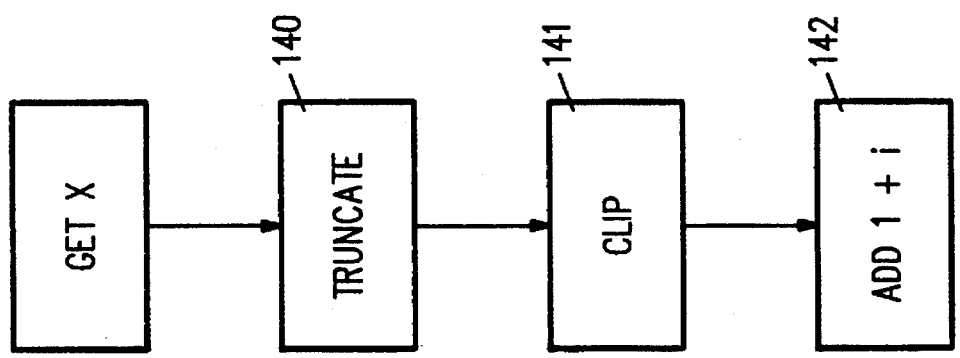
FIG. 14 is a simplified flow chart illustrating the processing necessary to implement standard rectangular decision regions.

Each of the problems in the prior art is addressed in the present invention with the cost being an increased computational burden and silicon area. When a system is locked onto the carrier frequency $f_{cr}$, the constellation is not spinning, thus white noise is the sole reason for measured sample points not landing on their corresponding constellation locations. In this case, the standard rectangular decision regions (such as in FIG. 8) produce the fewest number of errors. FIG. 14 shows a flowchart of the standard way to compute the correct decision using rectangular decision regions. If each square decision region has $2^N$ discrete levels of width (there are $2^{2N}$ separate points in each decision region), the least significant N bits of the real and imaginary parts of the sample x are truncated in step 140. This aligns the remaining points along the lower left corner of each decision region. To take care of sample points which lie far outside the constellation boundaries due to excessive noise, the truncated points are clipped in step 141. The real part and imaginary part of each resulting point will be even, since the decision regions are each two whole numbers wide. Conversely, the constellation points themselves have odd coordinates, because they are in the centers of the decision regions. To place the resulting points into the center of each decision region, 1+i is added to the truncated and clipped values for each point at step 142. The resulting points will sit directly on the proper constellation point after step 142. This implementation is computationally very simple.

Figure 15:
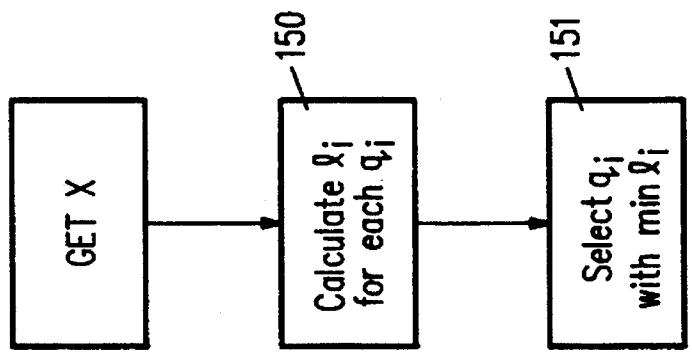
FIG. 15 is a simplified flow chart illustrating the processing necessary to implement the decision regions according to the present invention.

According to the present invention, to make each decision, a scalar $l_i$ is calculated at step 150 for each constellation point so that the constellation point corresponding to the minimum $l_i$ value 151 is the symbol which the decision device decides was transmitted. This method is illustrated by FIG. 15.

Figure 16:
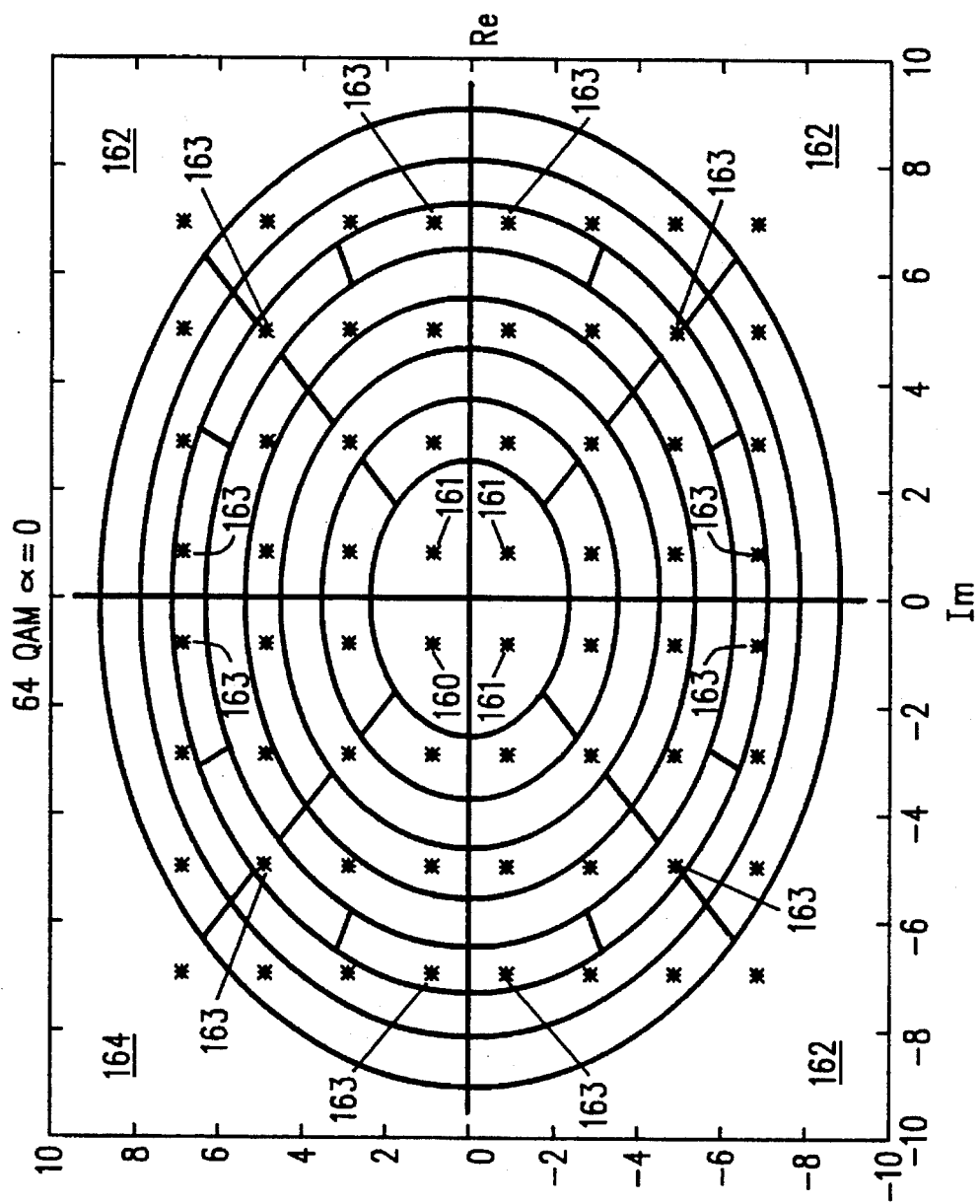
FIG. 16 is a plot of the complex plane showing the decision regions according to the first embodiment of the present invention.

In the extreme, however, when the carrier is not locked and assuming that there is no noise, a decision device based upon rotation of the constellation points is best. The decision regions for a circular decision device are shown in FIG. 16. Thus, the circular concentric decision regions capitalize on the observation that when the sample matrix is rotating, it is possible to identify samples more accurately by the radius of their orbit rather than their phase at any given time. The equations which produce these decision regions are as follows.

$$\text{received symbol}=q_i \text{ with minimum } l_i, l_i=||x|^2-|q_i|^2|$$

According to a first embodiment of the present invention, the minimization equation representing the correct decision for circular decision regions involves the calculation of the difference in the magnitude of the sample point x from the magnitude of each of the i constellation points $q_i$. The nearest constellation point having the minimum magnitude difference represents the decision.

Figure 1:
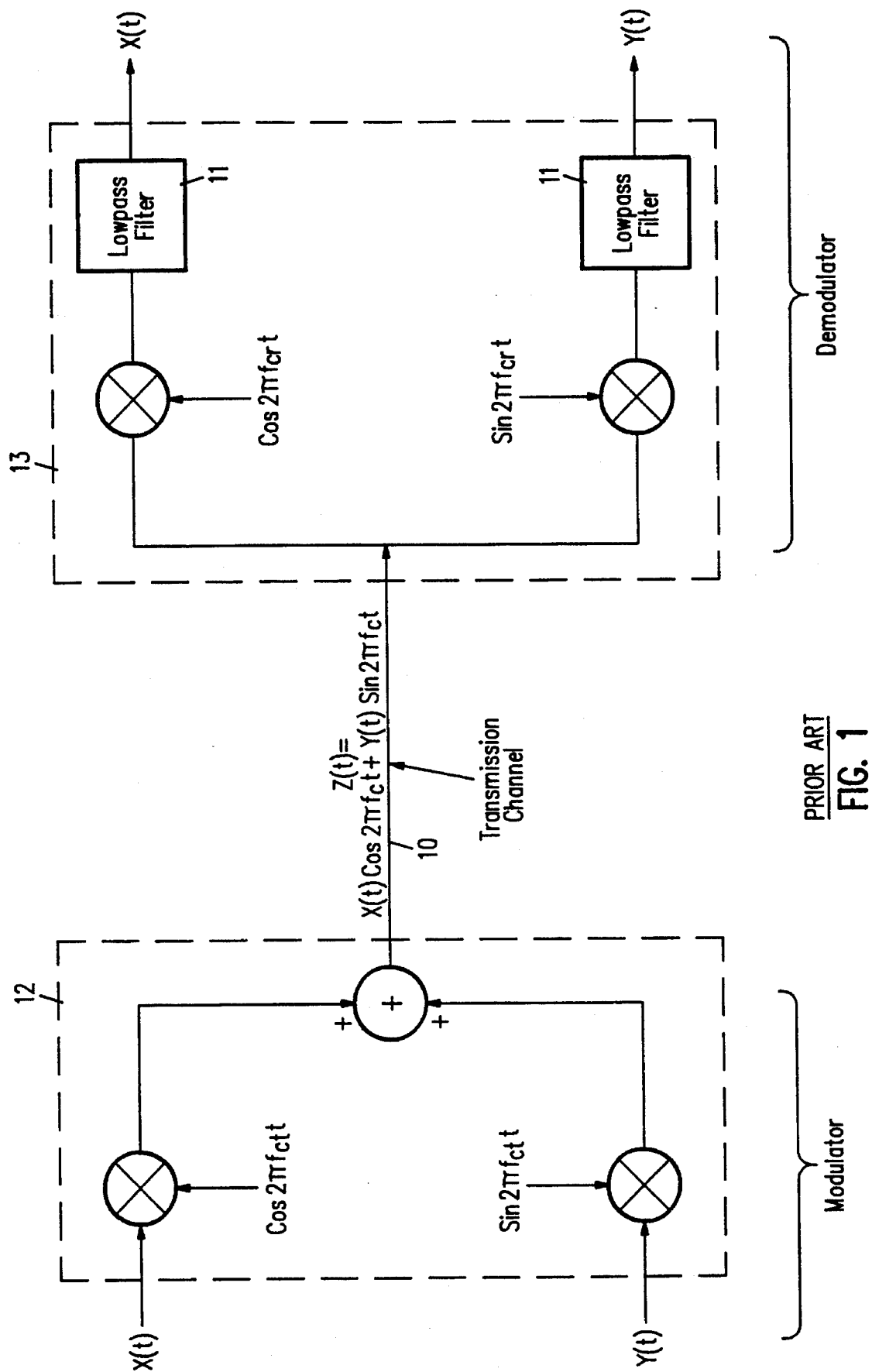
FIG. 1 illustrates the standard quadrature amplitude modulation (QAM) transmitter-receiver system.
Figure 2:
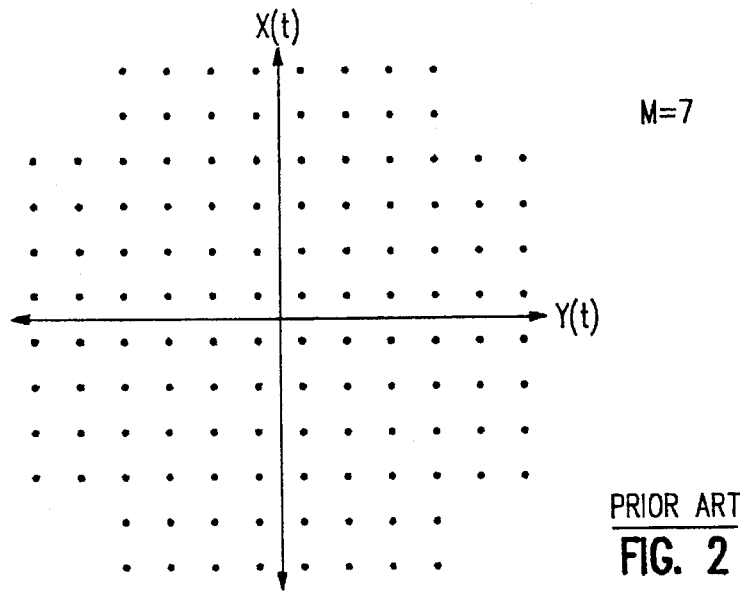
FIG. 2 depicts the constellation points for a 128-symbol (M=7=odd) alphabet designed for use with QAM.
Figure 3:
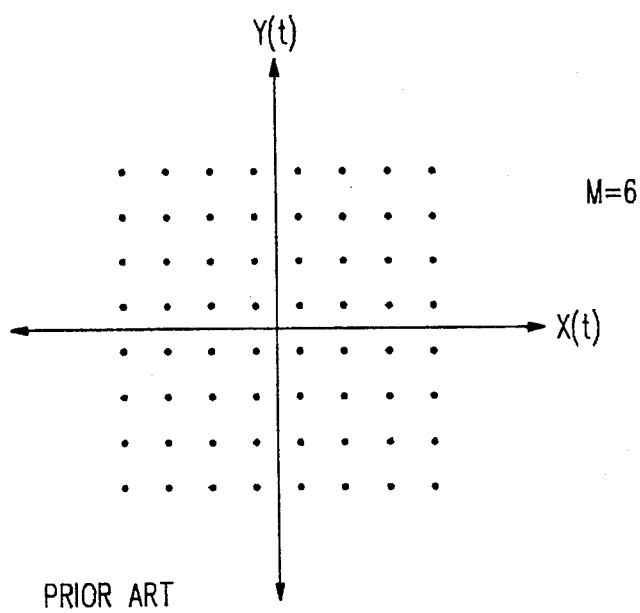
FIG. 3 depicts the constellation points for a 64-symbol (M=6=even) alphabet designed for use with QAM.
Figure 4:
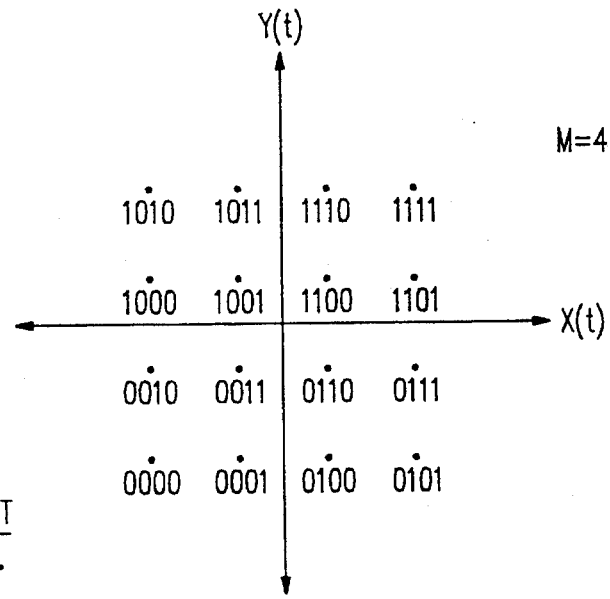
FIG. 4 depicts the constellation points and their corresponding binary symbols for a 64-symbol alphabet designed for use with QAM.
Figure 5:
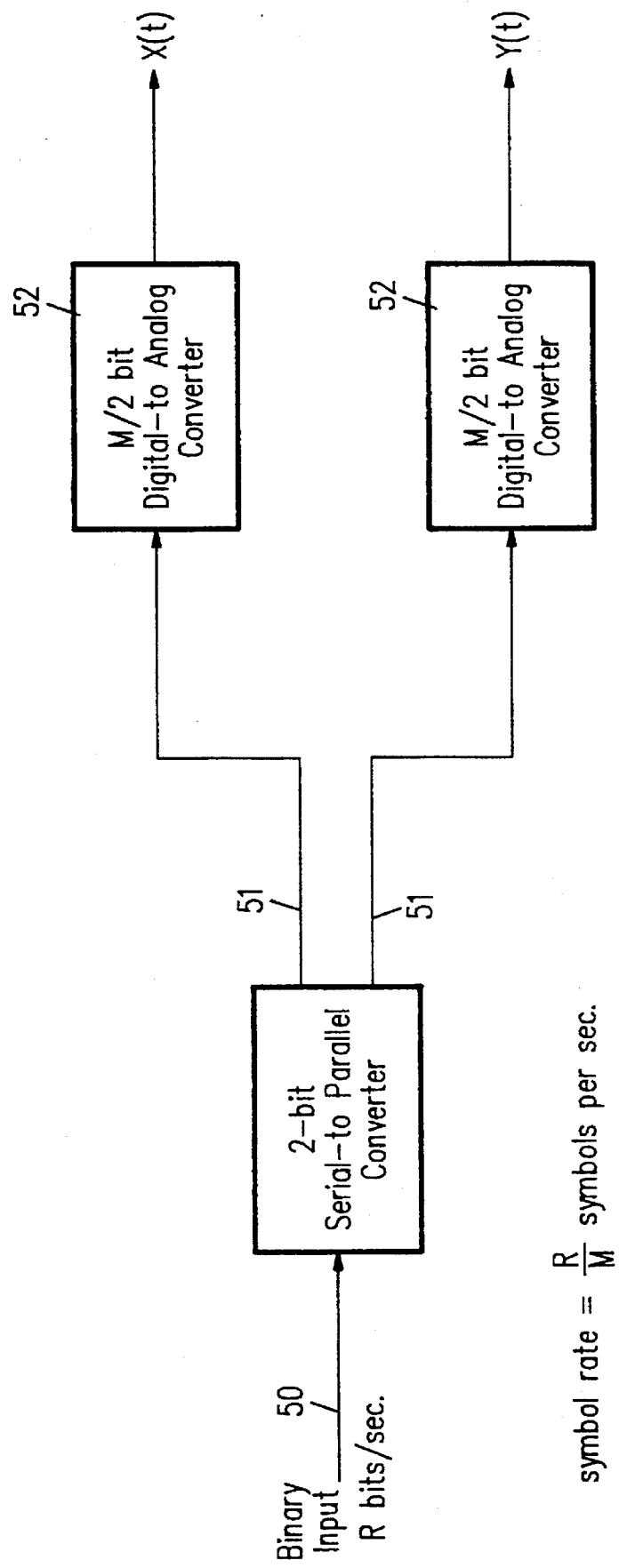
FIG. 5 shows a typical QAM coder for a transmitter when M is even.
Figure 6:
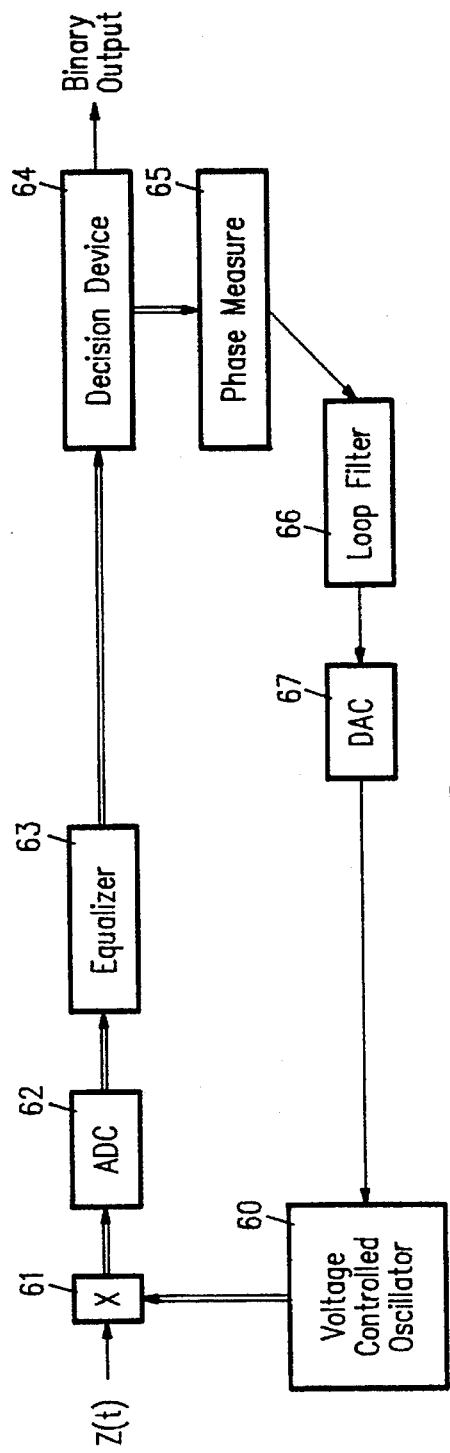
FIG. 6 is a simplified block diagram of a receiver system using an analog voltage controlled oscillator.
Figure 7:
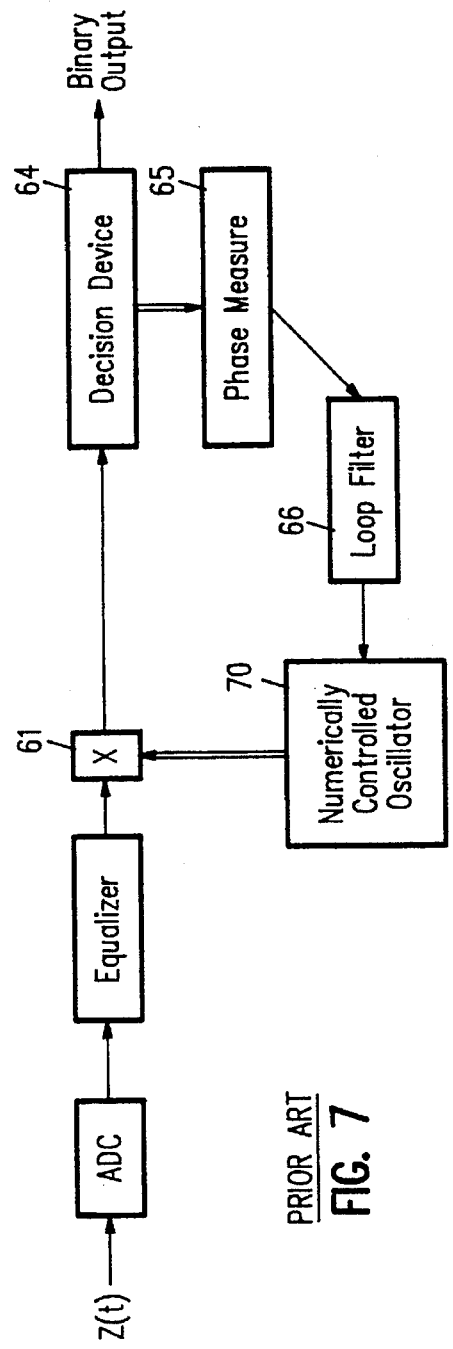
FIG. 7 is a simplified block diagram of a receiver system using a digital numerically controlled oscillator.
Figure 8:
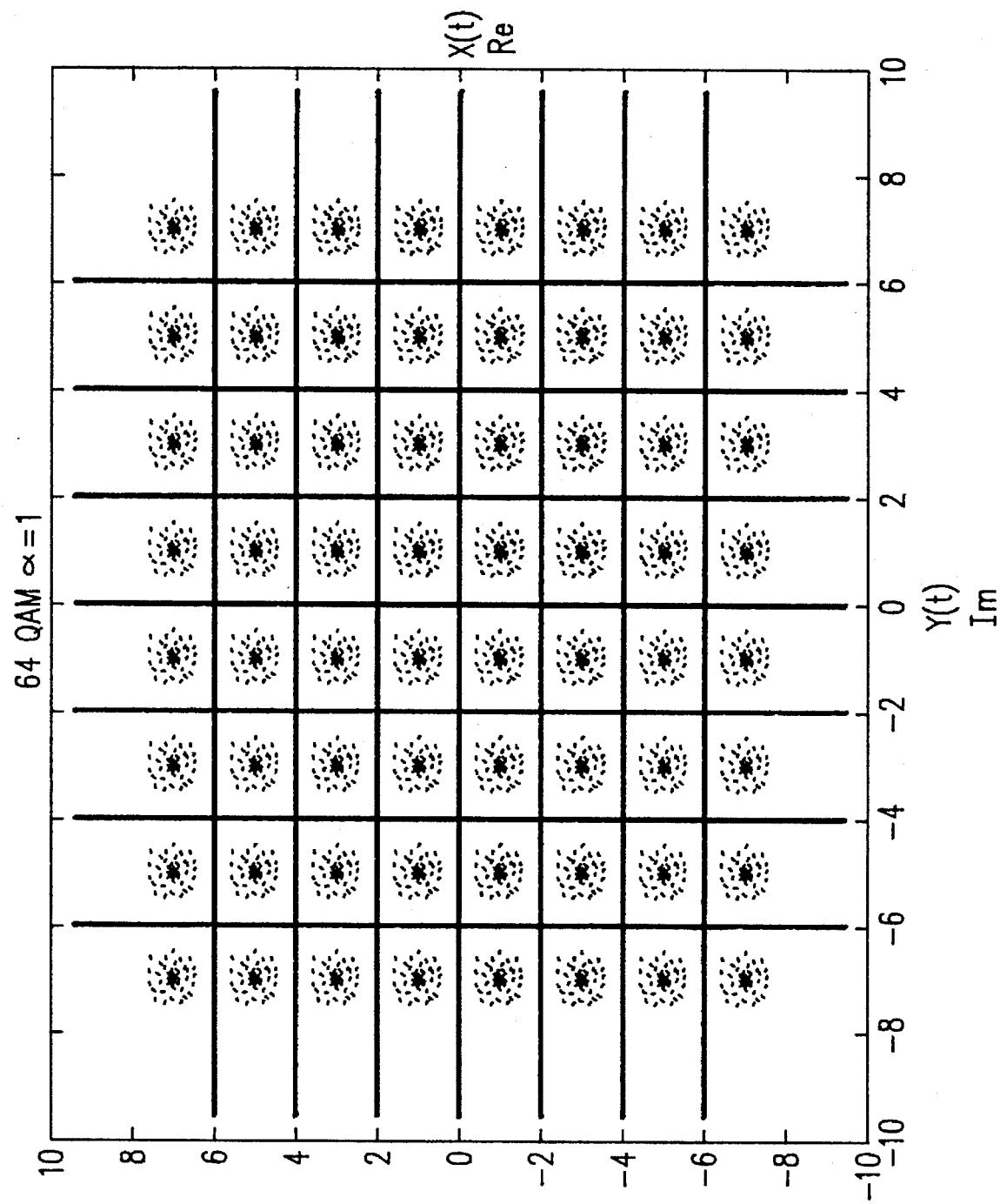
FIG. 8 is a plot of the complex plane showing random white noise and standard rectangular decision regions.
Figure 9:
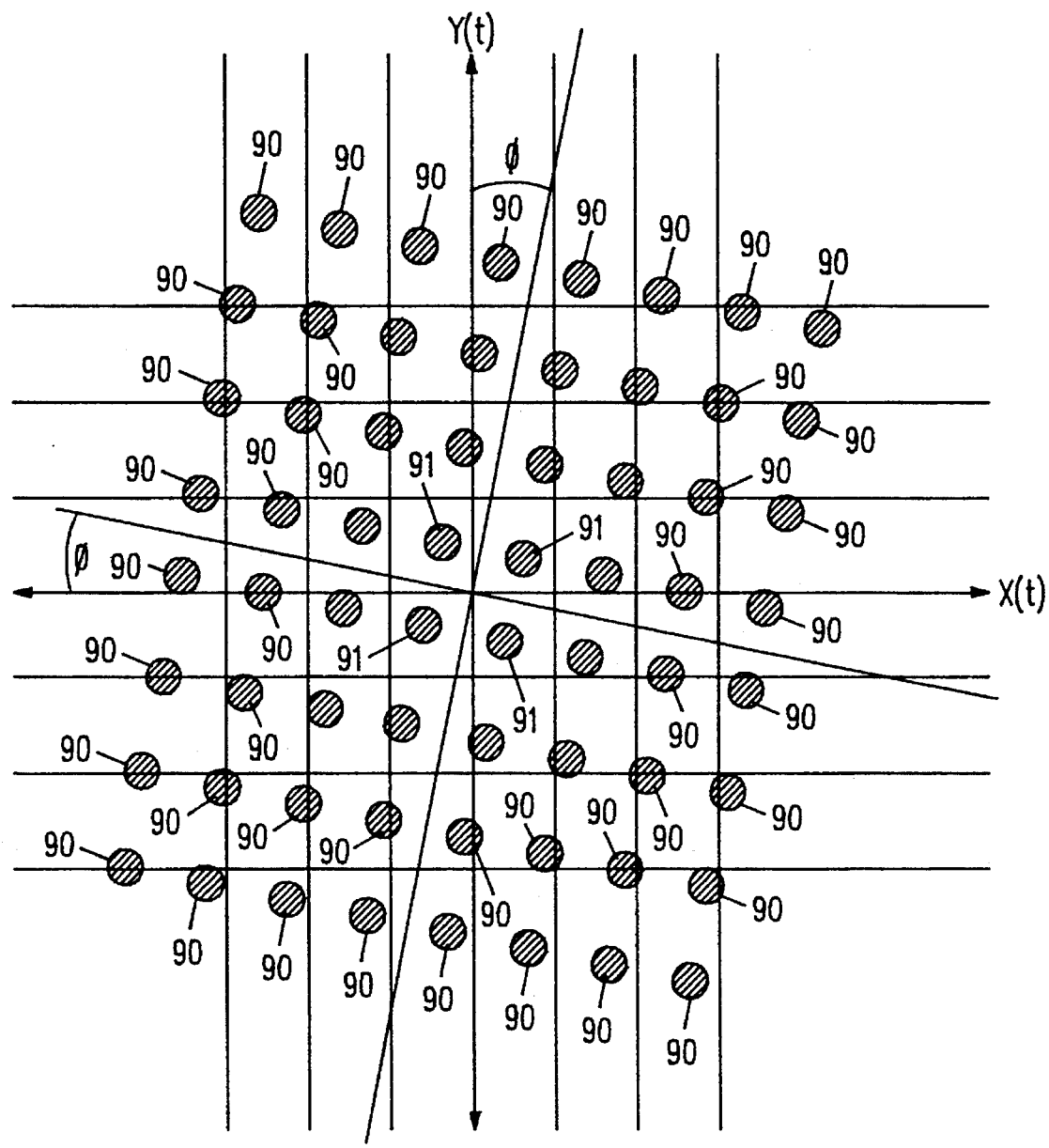
FIG. 9 is a plot of the complex plane illustrating the effect of symbol matrix rotation occurring when the system is not locked.
Figure 10:
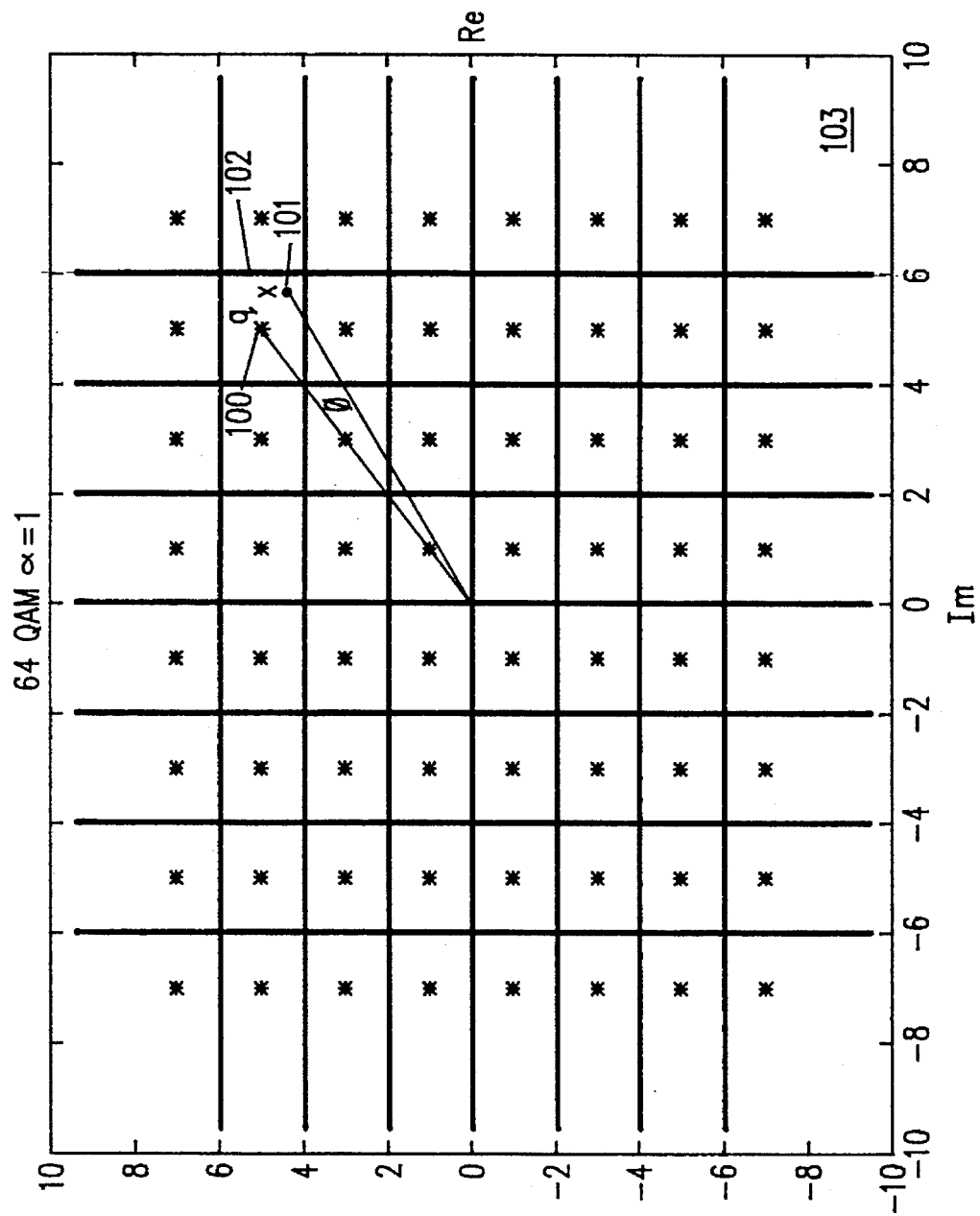
FIG. 10 is a plot of the complex plane illustrating the phase error angle $\phi$ for a correctly translated sample point x.
Figure 11:
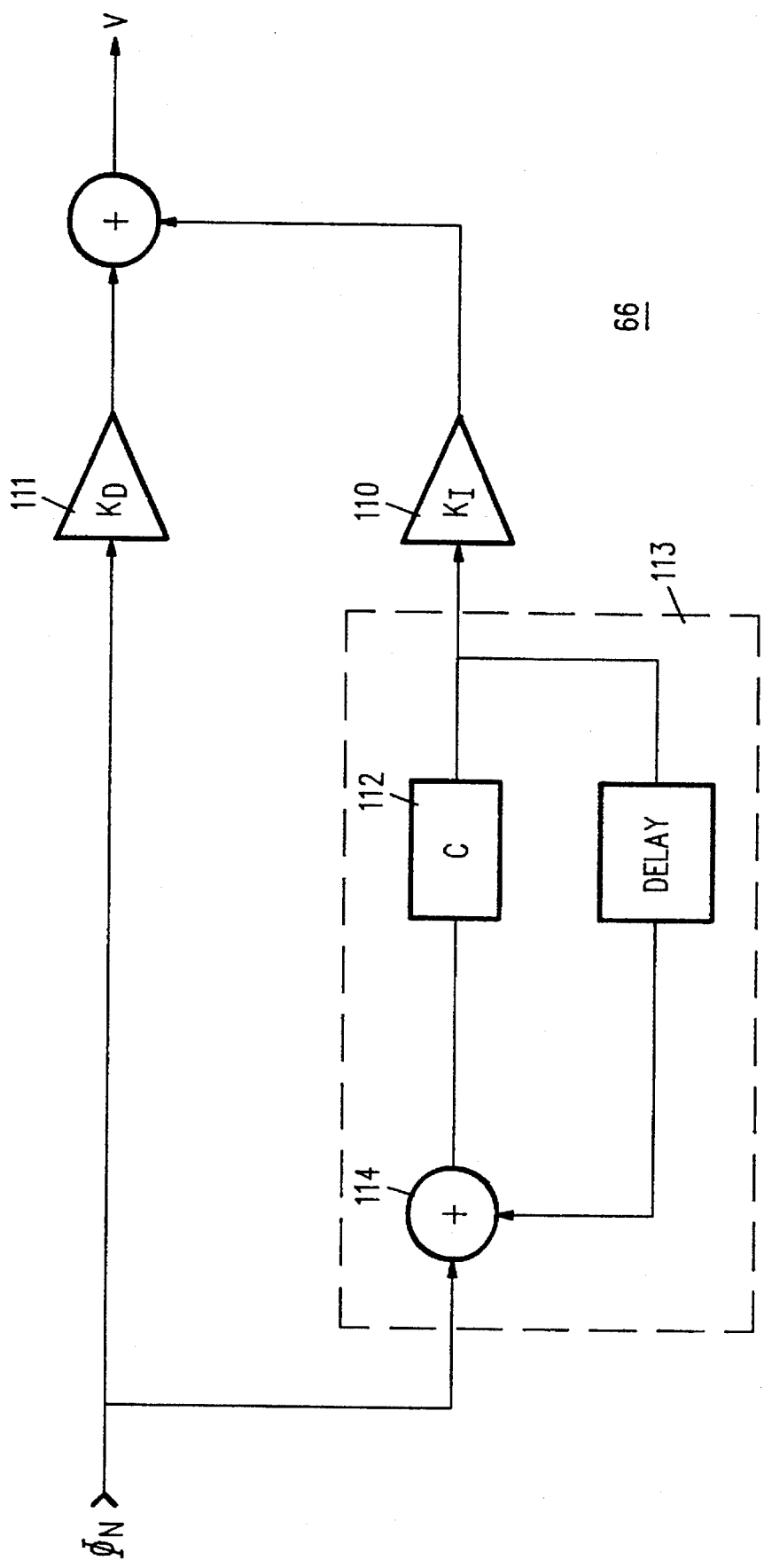
FIG. 11 is a simplified block diagram of a loop filter.
Figure 12:
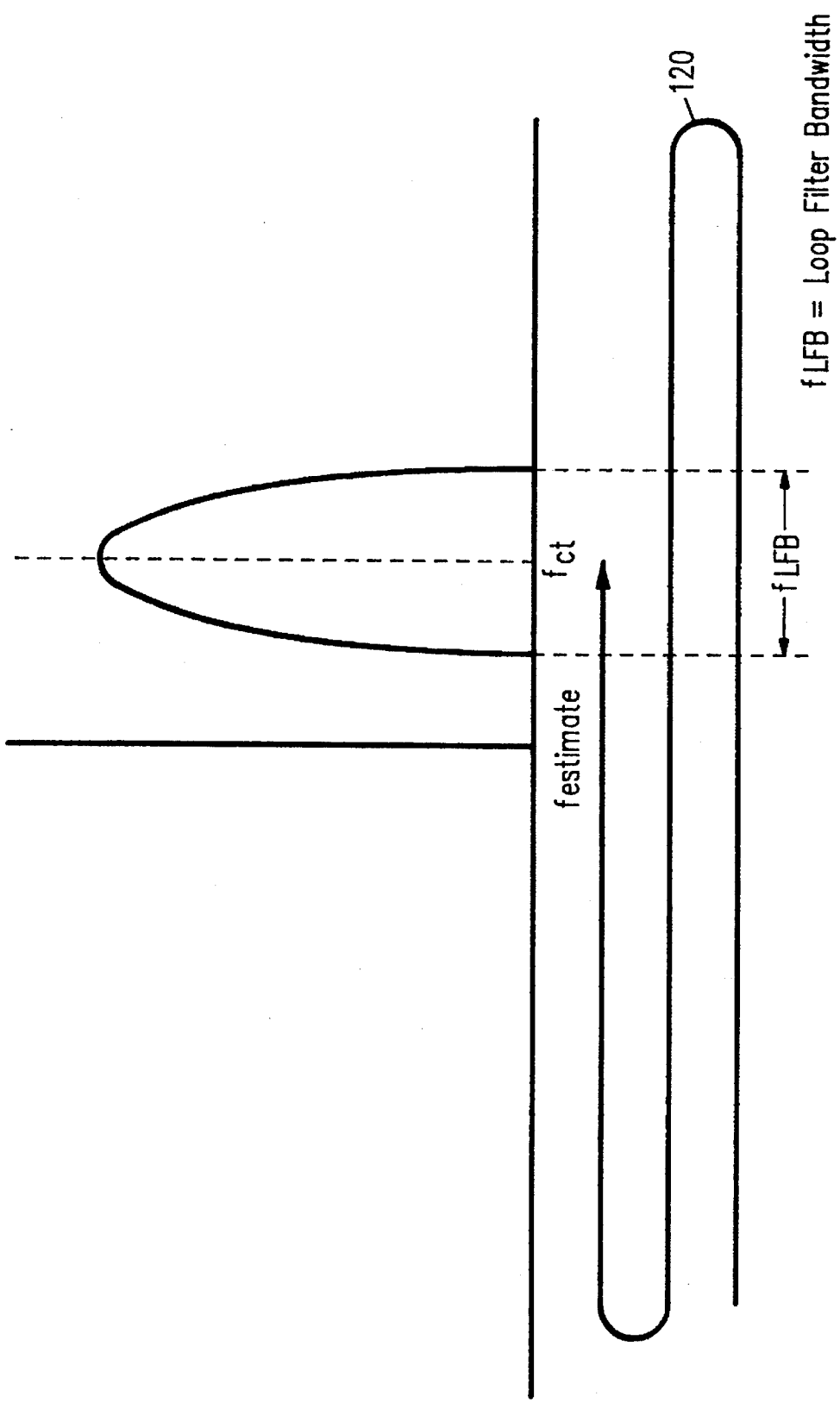
FIG. 12 illustrates the prior art method of frequency sweeping to widen the locking bandwidth.
Figure 13:
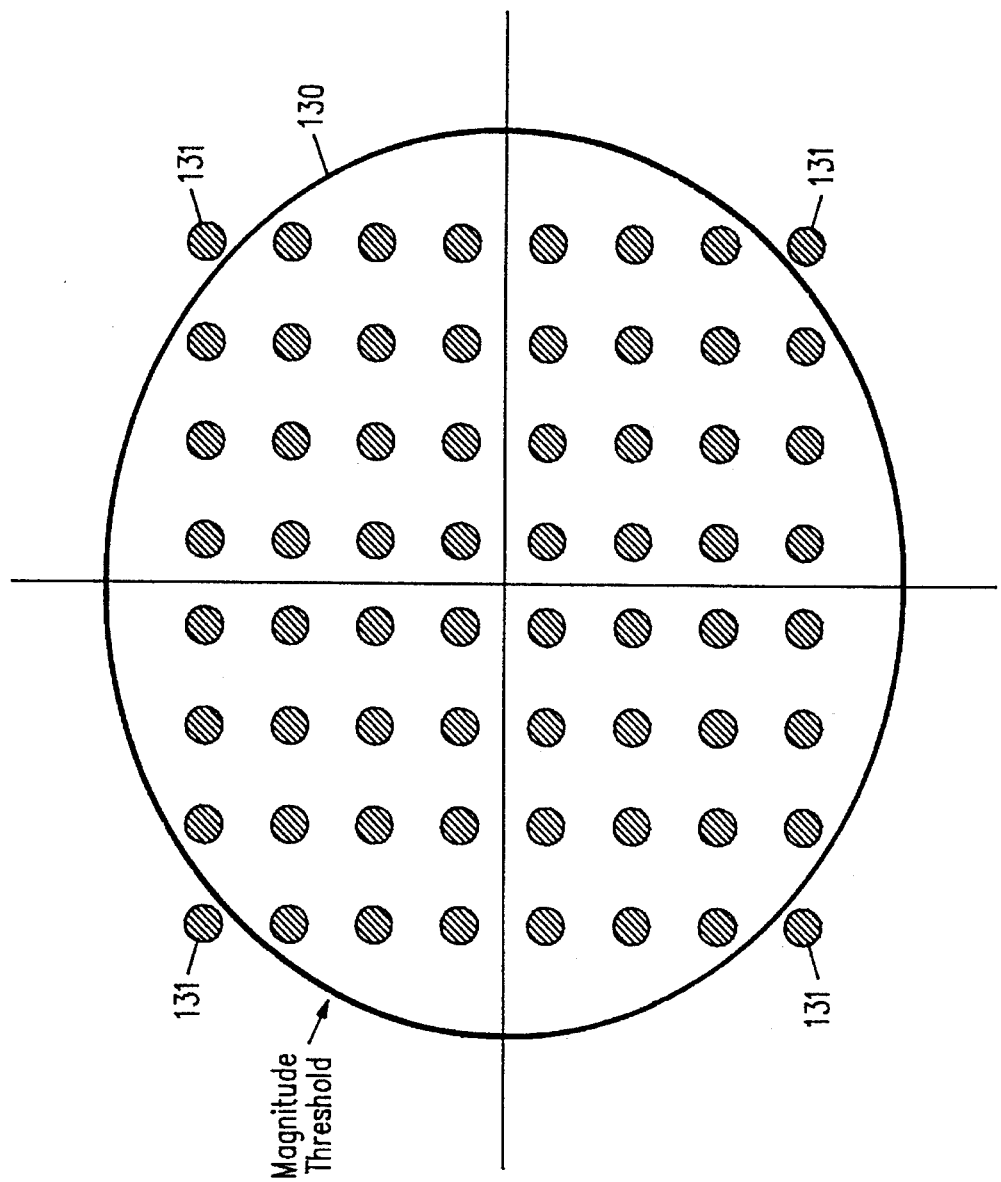
FIG. 13 illustrates the prior art method of corner point detection to widen the locking bandwidth.
Figure 17:
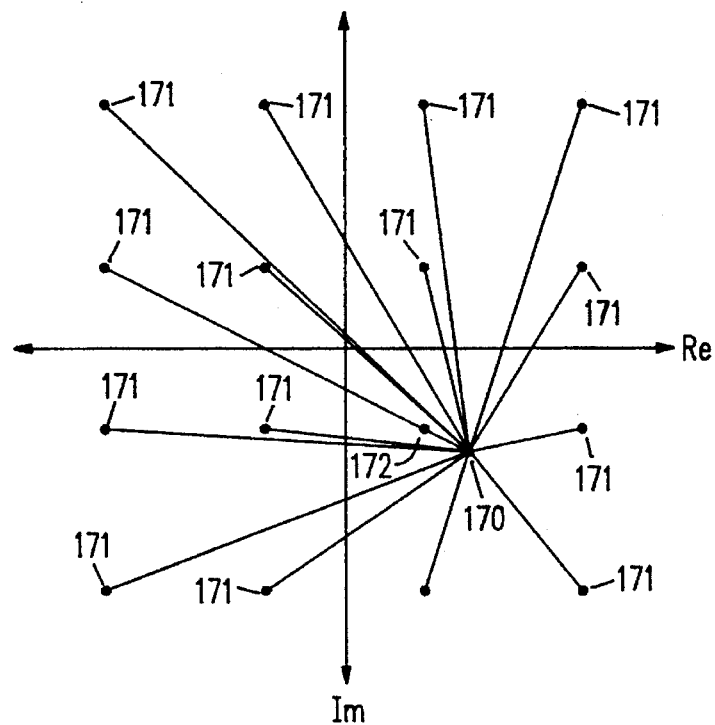
FIG. 17 is a plot of the complex plane illustrating the calculation of the euclidean distance between the sample point x and each constellation point $q_i$ according to the second embodiment of the present invention.

The standard rectangular decision device can be expressed as selecting the constellation point $q_i$ that is geometrically closest to the sample point x. Thus, the equation representing this calculation involves the calculation of the euclidean distance between the sample point x at 170 and each of the constellation points $q_i$ at 171 as illustrated in FIG. 17. Selecting the constellation point $q_i$ at 172 which has minimum distance to the sample point x at 170 achieves rectangular decision regions such as is shown in FIG. 8. The present invention combines the two extremes so as to have a balanced approach that works well whether the system is locked or is not locked.

According to a second embodiment of the present invention, two complementary weighting factors are used to provide a weighted average of the two decision criteria in order to make the correct decision. The final, combined equation is as follows.

$$\text{symbol} = q_i \text{ with minimum } 1_i I_i = \alpha * (|x - q_i|^2) + (1 - \alpha) * (||x|^2 - |q_i|^2|)$$

Here, $\alpha$ is the weight for representing standard rectangular decision regions, while $(1-\alpha)$ is the weight for representing the circular decision regions, and "*" represents multiplication. The range for $\alpha$ is $0 < \alpha \leq 1$.

To simplify the operation according to the present invention, $\alpha$ is not lowered all the way to zero. However, it can be lowered very close to zero. As illustrated in FIG. 16, for any given constellation point $q_i$ 160, there are at least three other constellation points 161 which have the same magnitude—at least one in each of the other three quadrants 162. (For 64 symbol QAM, there are some constellation points $q_i$ 163 which have the same magnitude as eleven other points 163—two in the same quadrant 164 and three in each of the other three quadrants 162.) If $\alpha$ were allowed to go all the way to zero, there would be at least four points with the same minimum magnitude difference. Thus, the proper decision would be unclear. By adding in a very small portion of the geometric distance to the quantity computed for each constellation point $q_i$, the closest point $q_i$ of the group having equal magnitudes will be properly selected.

The variable $\alpha$ according to the present invention balances the effects of white noise versus constellation rotation. When $\alpha$ is 1 this simplifies to the standard euclidean distance equation which implements rectangular decision regions. However, when $\alpha$ approaches zero the decision regions primarily discern the orbit or radius of the sample points x. This is most effective when the error is dominated by constellation rotation occurring due to carrier frequency $f_{ct}$ unlock. Accurate decision making is important before locking occurs because, in the absence of a training sequence, the rotational phase range during which locking can occur is limited to the range during which the decision device can make accurate decisions. By using the minimization equation resulting in circular decision regions, the correct decisions will be made over a wider phase angle during the unlocked sample matrix's rotation. This wider angle during which the correct decisions are made translates into a higher probability of acquiring lock.

Figure 27:
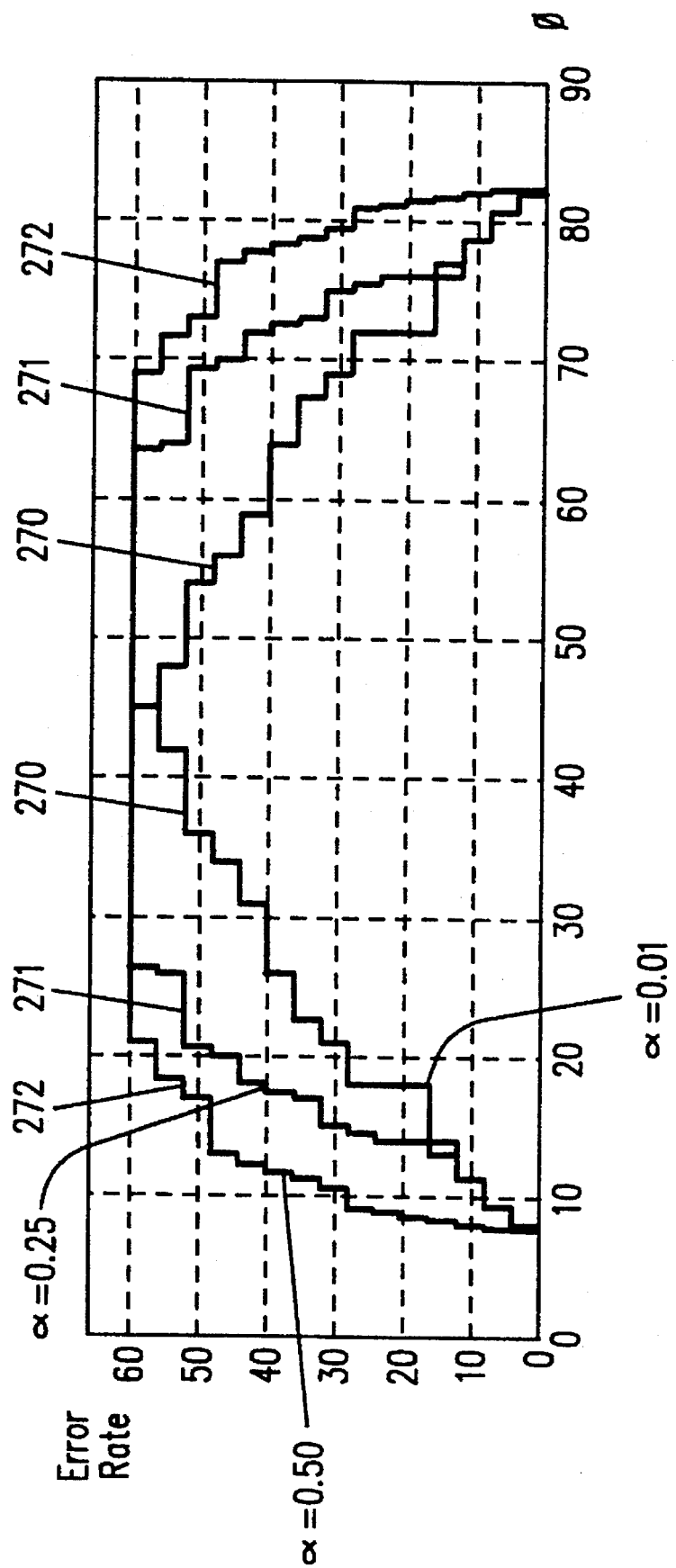
FIG. 27 illustrates increased tolerance to phase error when $\alpha$ is small according to the present invention.

The plots of decision error rate versus phase error $\phi$ (assuming no white noise) shown in FIG. 27 for different $\alpha$ (0.01, 0.25, and 0.5) illustrates the reduced sensitivity to rotation as $\alpha$ is increased. The lowest error rates when phase error $\phi$ dominates is illustrated in FIG. 27 by curve 270, where $\alpha$ is small so that the circular decision regions are used. As the decision regions are made more rectangular ($\alpha$ increases), the error rate increases as $\phi$ increases. This phenomenon is illustrated by curves 271 and 272, where $\alpha$ takes on values of 0.25 and 0.5, respectively. When the decisions are more accurate, the average phase error information supplied to the loop filter 66 will be more accurate, and the system will have a widened bandwidth over which it can acquire lock.

The benefits of using the circular decision regions are clearly shown for a rotating constellation in FIG. 27. However, there is a penalty involved in using these decision regions when the system is locked. The penalty is that more errors will occur on average when the system is locked. When the system is locked, white noise accounts for the dispersion of sample points x away from the constellation points $q_i$. Since the distribution of points x is essentially random and centered around each constellation point $q_i$ when the system is locked, the rectangular decision regions provide the lowest probability of error, since the decision is based upon which constellation point $q_i$ is closest to the sample x when rectangular decision regions are used. In contrast, using the circular decision regions, the geometrically closest constellation point $q_i$ is not always the one that is chosen by the decision device. If the sample matrix is not rotating, then the choice of a constellation point $q_i$ which is not the closest point is usually an error. If the bandwidth of the loop filter is high enough, the increased errors by the decision device will not only cause increased errors in the output data, but will also increase the jitter.

Figure 18:
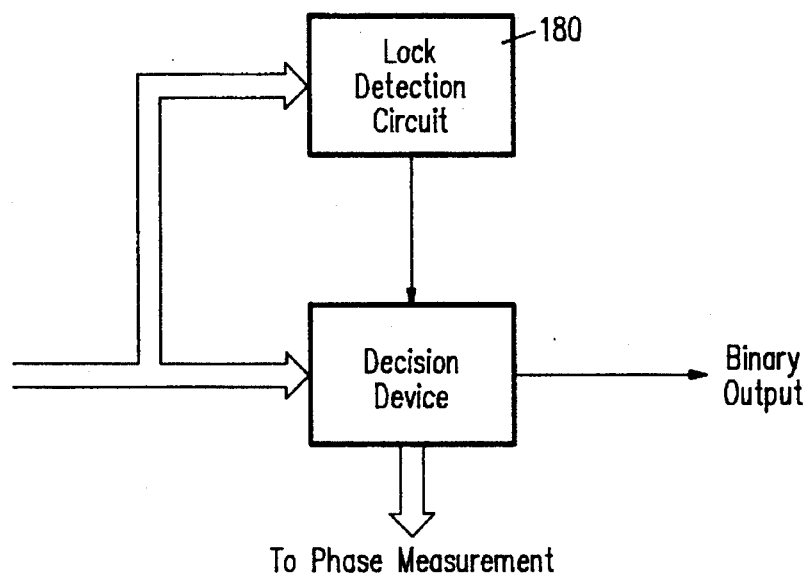
FIG. 18 is a simplified block diagram illustrating the interface between a lock detection circuit and the decision device according to the present invention.
Figure 19:
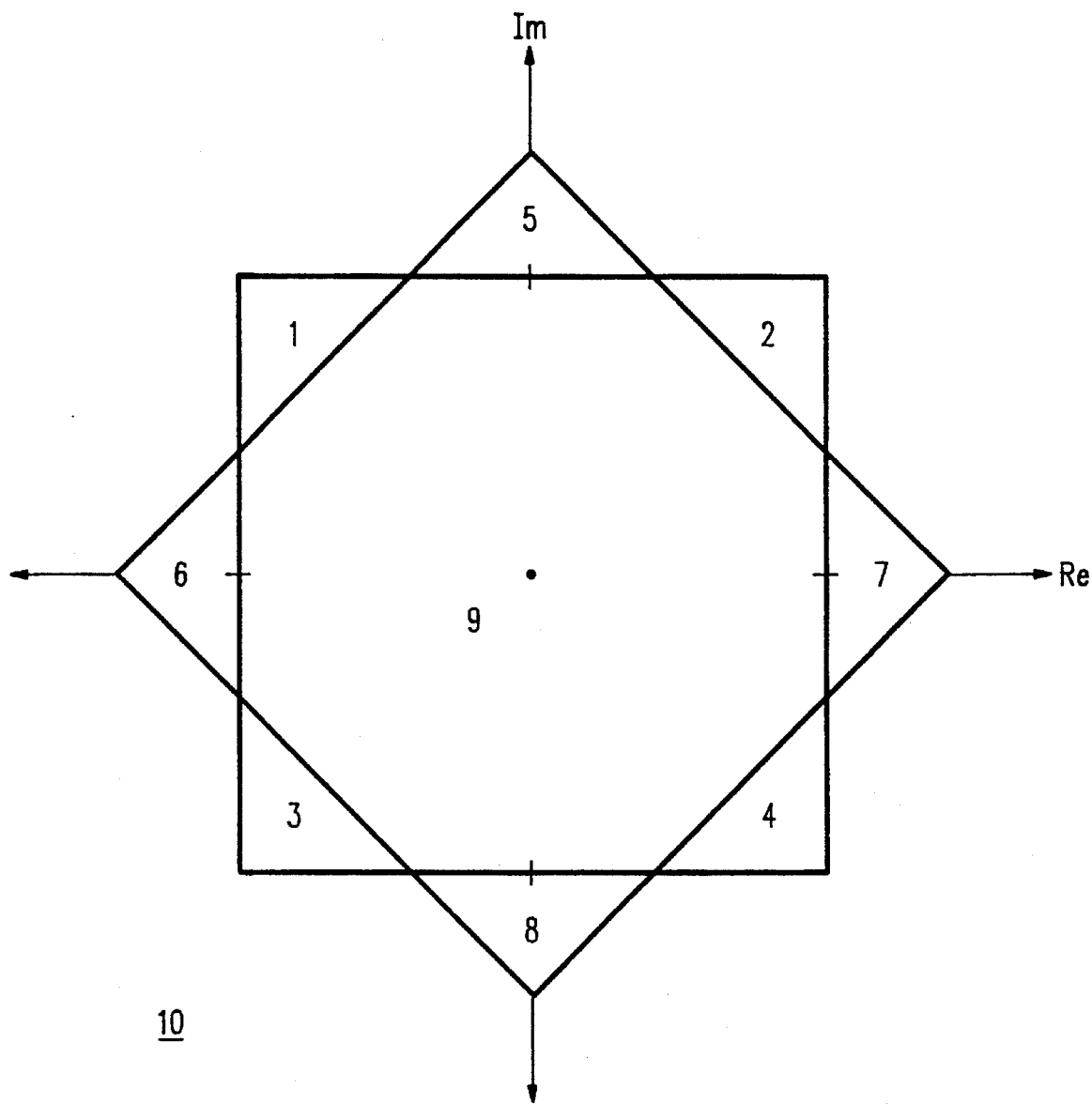
FIG. 19 is a plot of the complex plane divided into regions used to implement a lock detection circuit according to the present invention.
Figure 20:
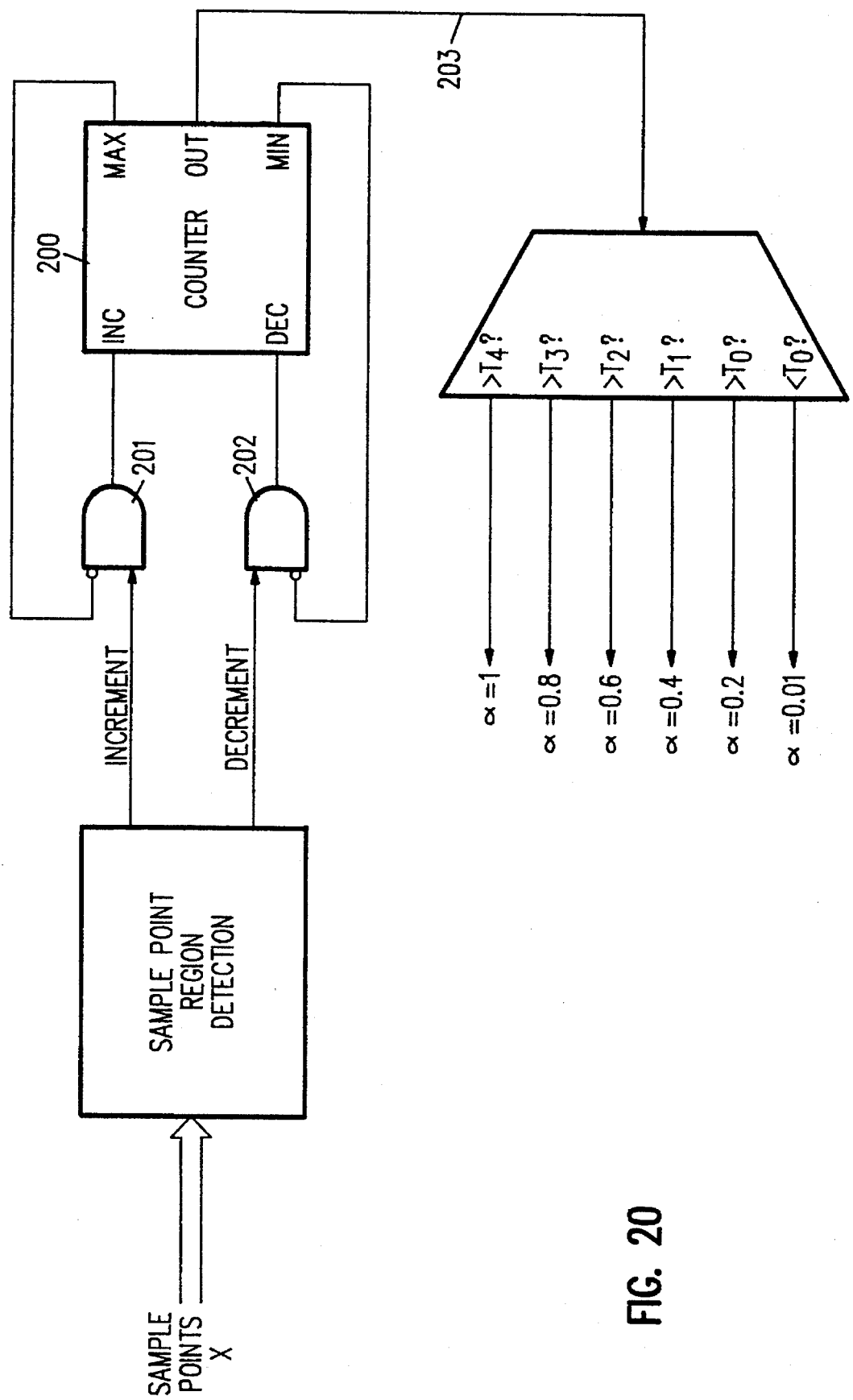
FIG. 20 is a simplified block diagram illustrating the use of a counter in a lock detection circuit according to the present invention.
Figure 21:
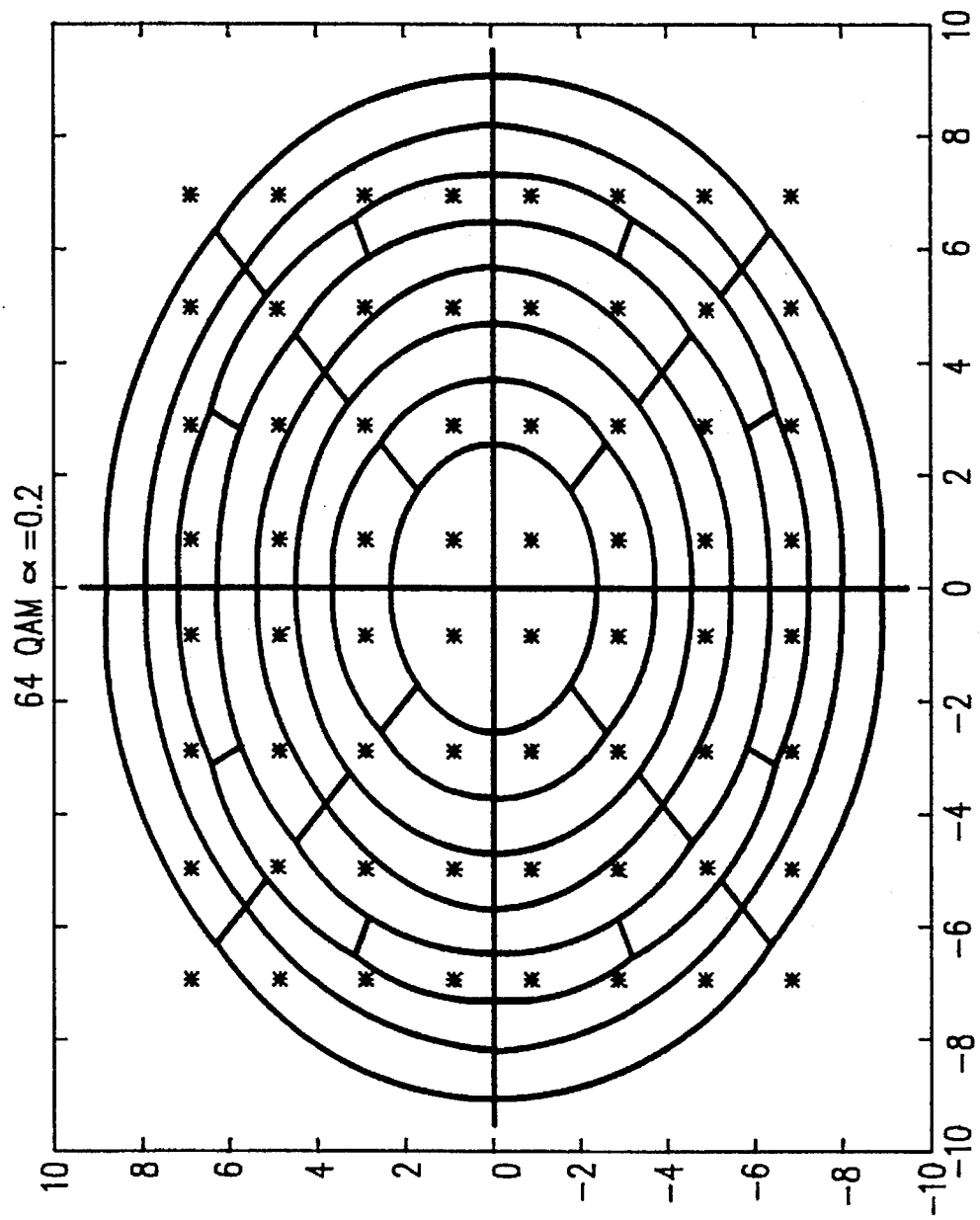
FIG. 21 is a plot of the complex plane showing the decision regions when $\alpha=0.2$ according to the second embodiment of the present invention.
Figure 22:
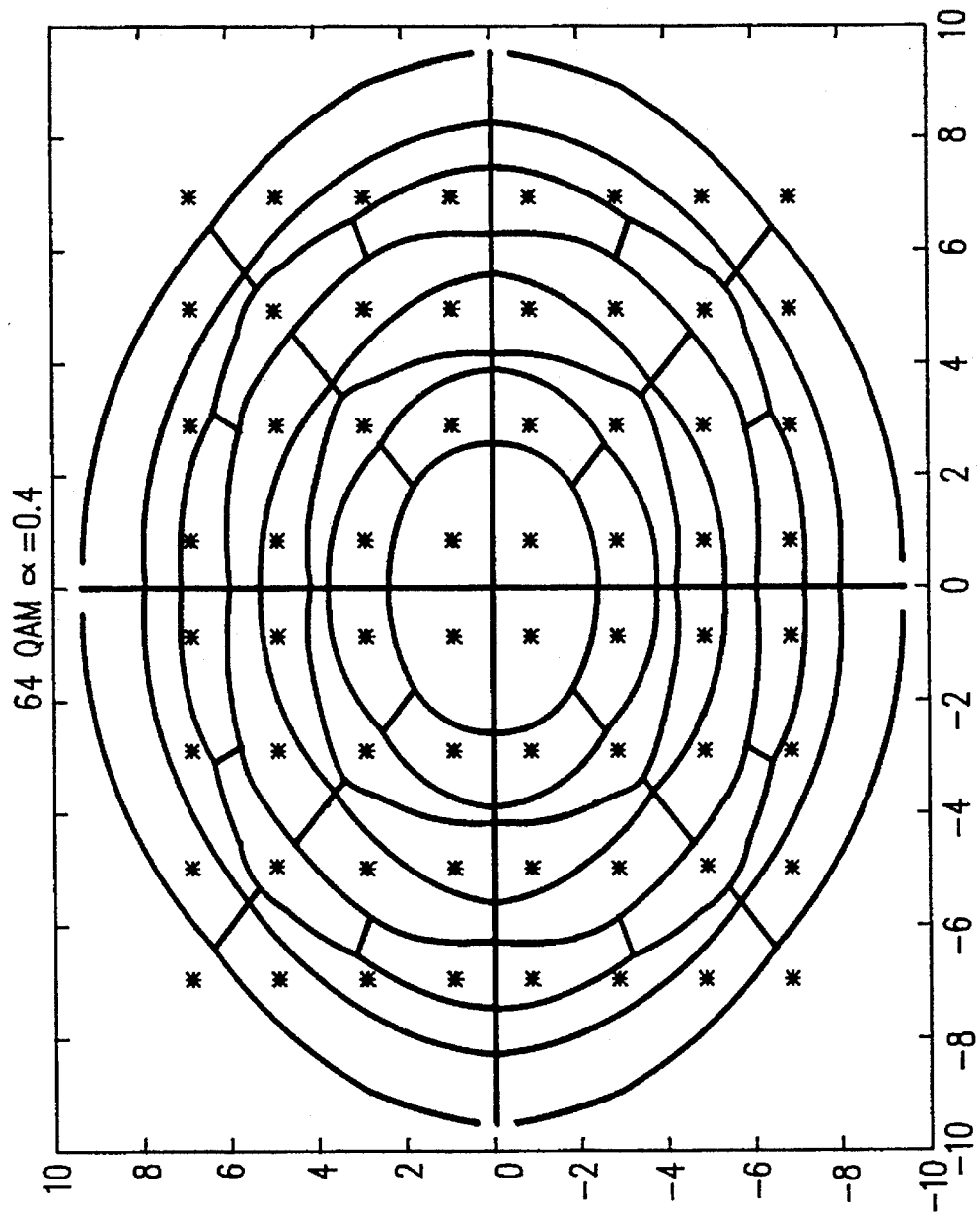
FIG. 22 is a plot of the complex plane showing the decision regions when $\alpha=0.4$ according to the second embodiment of the present invention.
Figure 23:
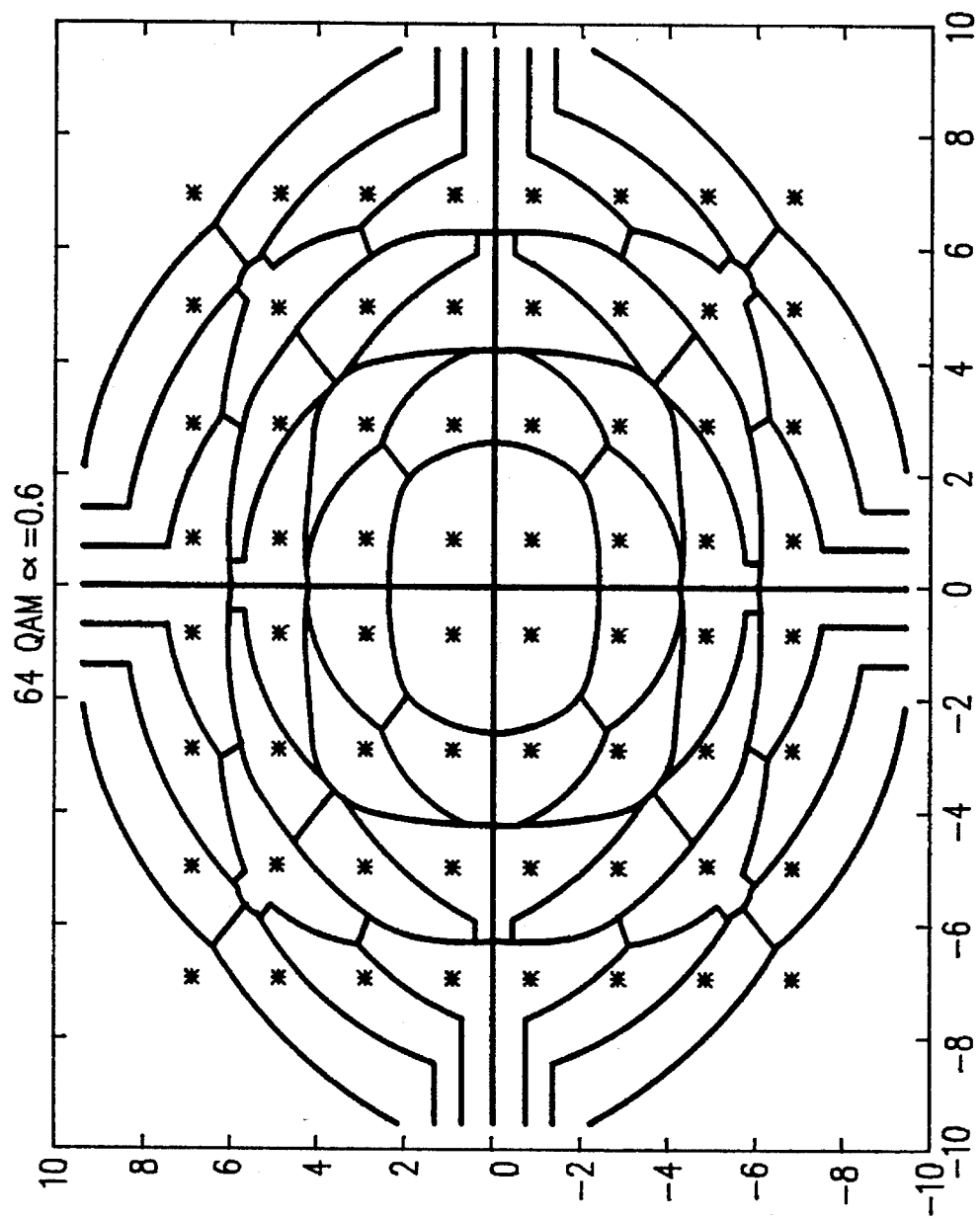
FIG. 23 is a plot of the complex plane showing the decision regions when $\alpha=0.6$ according to the second embodiment of the present invention.
Figure 24:
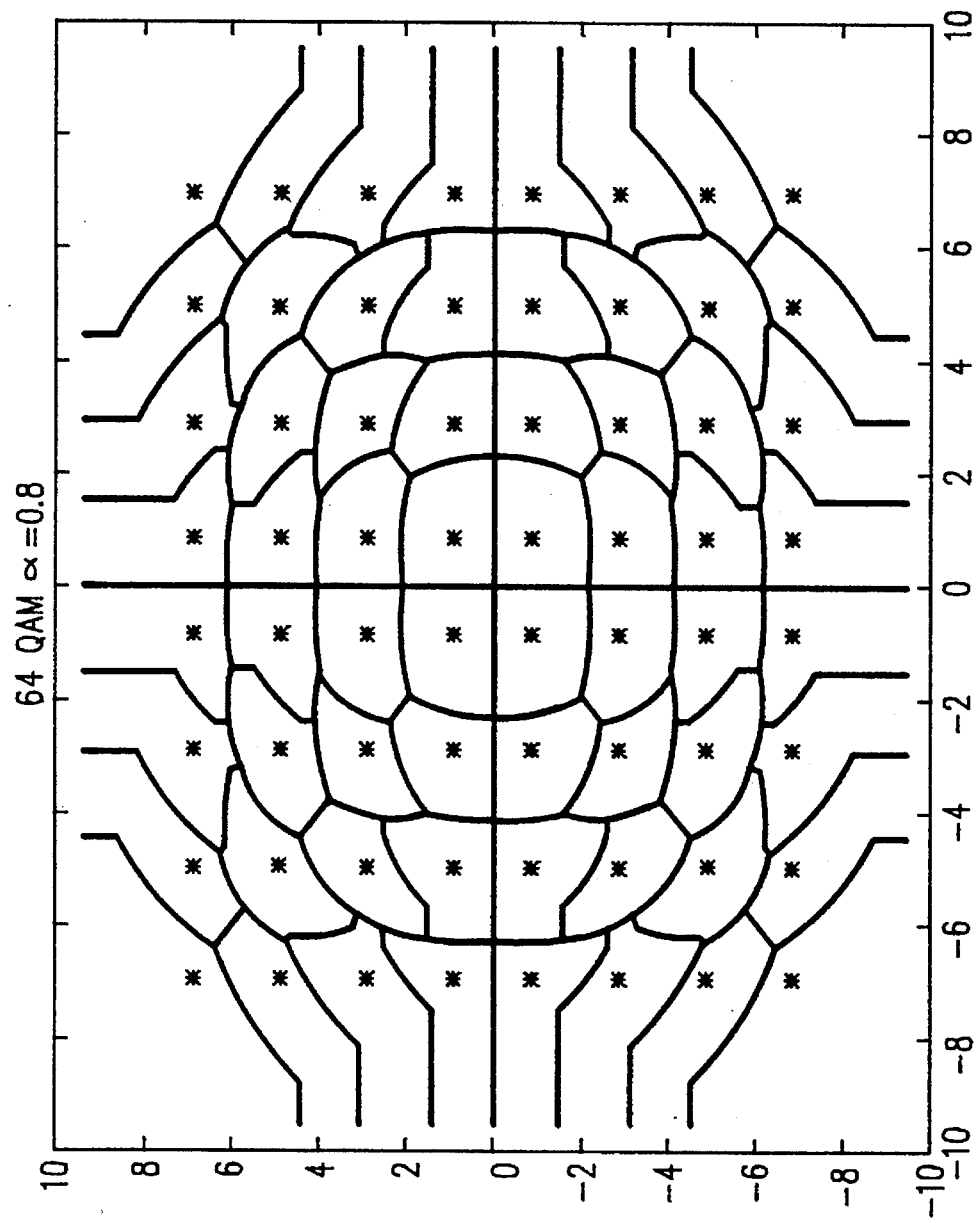
FIG. 24 is a plot of the complex plane showing the decision regions when $\alpha=0.8$ according to the second embodiment of the present invention.

Therefore, for closer to ideal performance, a carrier lock detection circuit 180 is used to adjust $\alpha$ as shown in FIG. 18. When unlocked a low $\alpha$ near zero is used; when locked a high $\alpha$ at or near one is used. This retains the benefits of each decision system without incurring the penalties. There are many ways in which a carrier lock detection circuit 180 can be implemented. For example, one way is related to the corner point methods. FIG. 19 illustrates the complex plane divided into ten separate regions, 1, 2, 3, 4, 5, 6, 7, 8, 9, & 10. FIG. 20 illustrates one way to implement a lock detection circuit 180. A counter 200 is maintained to help the system determine whether or not it is locked. The counter 200 initially begins set to zero or some other starting value which indicates an unlocked condition. The starting value of the counter is not very important because adjustment to the counter value via the incrementing and decrementing quickly alters the initial counter value to a level indicative of the locking status of the system. Whenever a sample point is detected within regions 1, 2, 3, or 4, the counter 200 is incremented; whenever a sample point is detected within regions 5, 6, 7, or 8, the counter 200 is decremented. The counter 200 remains unchanged when sample points are detected in any other areas 9 & 10, such as inside 9 or outside 10 the other eight numbered regions 1, 2, 3, 4, 5, 6, 7, & 8.

If the counter 200 reaches a certain predetermined positive value threshold, the lock detection circuit 180 concludes that it is locked. When the system is locked, instead of counting upward continually, the lock detection circuit 180 reaches a certain maximum value from which it does not count upward anymore when sample points x are detected in the regions 1, 2, 3, or 4. This clipping function is performed in FIG. 20 by gate 201. Similarly, when the system is not locked, the counter 200 has a minimum value from which it will not count down further. This clipping function is performed in FIG. 20 by gate 202. When the system is not locked, the distribution of the sample points x having the largest magnitudes (the corner constellation points and those points close to the corner points) is essentially randomly distributed along a circular band crossing all eight of the numbered regions 1, 2, 3, 4, 5, 6, 7, & 8 in FIG. 19.

The decrement quantity will always be of greater magnitude than the increment quantity. If the decrement quantity and the increment quantity are equal, it is not possible for the counter to change from a locked state to an unlocked state, since the number of points detected in regions 5, 6, 7, & 8 will be statistically equal to the number of points detected in regions 1, 2, 3, & 4 even when the system is not locked. Since the distribution is random when the system is not locked, the number of sample points x detected in regions 1, 2, 3, and 4 will approximately equal the number of sample points x detected within regions 5, 6, 7, and 8 over any sufficiently large time frame. Thus, if the increment quantity is equal to the decrement quantity for the counter 200, the net movement of the counter 200 will be zero when the system is not locked. As the time frame is widened, the probability that the counter 200 will have moved significantly far from its initial value drops off dramatically. Therefore, it is important to make the increment quantity (adjusting toward a locked condition) less than the decrement quantity (adjusting toward an unlocked condition).

In contrast, when the system is locked, sample points x should never be detected in regions 5, 6, 7, or 8 of FIG. 19, and quite a few sample points x should be detected in regions 1, 2, 3, or 4. Thus, the counter output 203 should steadily increase in value when the system is locked. Based upon the number of constellation points within regions 1, 2, 3, or 4, the predetermined counter threshold is selected so that the probability that the system is locked is very high if the counter threshold is reached.

According to the embodiments of the present invention, the circular decision regions are used while the system is locking. When the system locks, the counter 200 begins to accumulate a positive value. In the presently preferred embodiment, several predetermined thresholds are defined on the counter value to indicate when $\alpha$ is stepped up to a higher level. For example, five different thresholds ($T_0$, $T_1$, $T_2$, $T_3$, and $T_4$ in FIG. 20) are defined so that $\alpha$ is stepped from 0.01, to 0.2, to 0.4, to 0.6, to 0.8, and finally to 1.00 when the highest threshold is reached. FIGS. 21–24 illustrate the shape of the decision regions for 64 QAM when $\alpha$ is 0.2, 0.4, 0.6, and 0.8, respectively. (FIG. 8 shows $\alpha$ equal one; FIG. 16 shows $\alpha$ near zero.) Alternatively, instead of providing a few discrete number of steps, the counter value can directly be normalized so that $\alpha$ continually increases and decreases with the same resolution as the counter 200 itself.

The present invention requires substantial computations. For instance, the euclidean distance squared and the squared magnitude differential between the sample point and each constellation point must be calculated for every constellation point for each sample. For the standard rectangular decision regions, the real components of the sample point x and the constellation point $q_i$ are subtracted, and the imaginary component of the sample point x and the constellation point $q_i$ are subtracted. These differences are squared and added together to produce the euclidean distance squared for one constellation point. To calculate the squared magnitude differential, the real part and imaginary part of the sample point are each squared and added together. The same operation is performed on the constellation point, and a subtraction of the two sums produces the squared magnitude difference for one constellation point. These calculations are illustrated by the following equations.

Sample point $x = x_R + ix_I$

Constellation point $q_i = q_{iR} + iq_{iI}$

Figure 25:
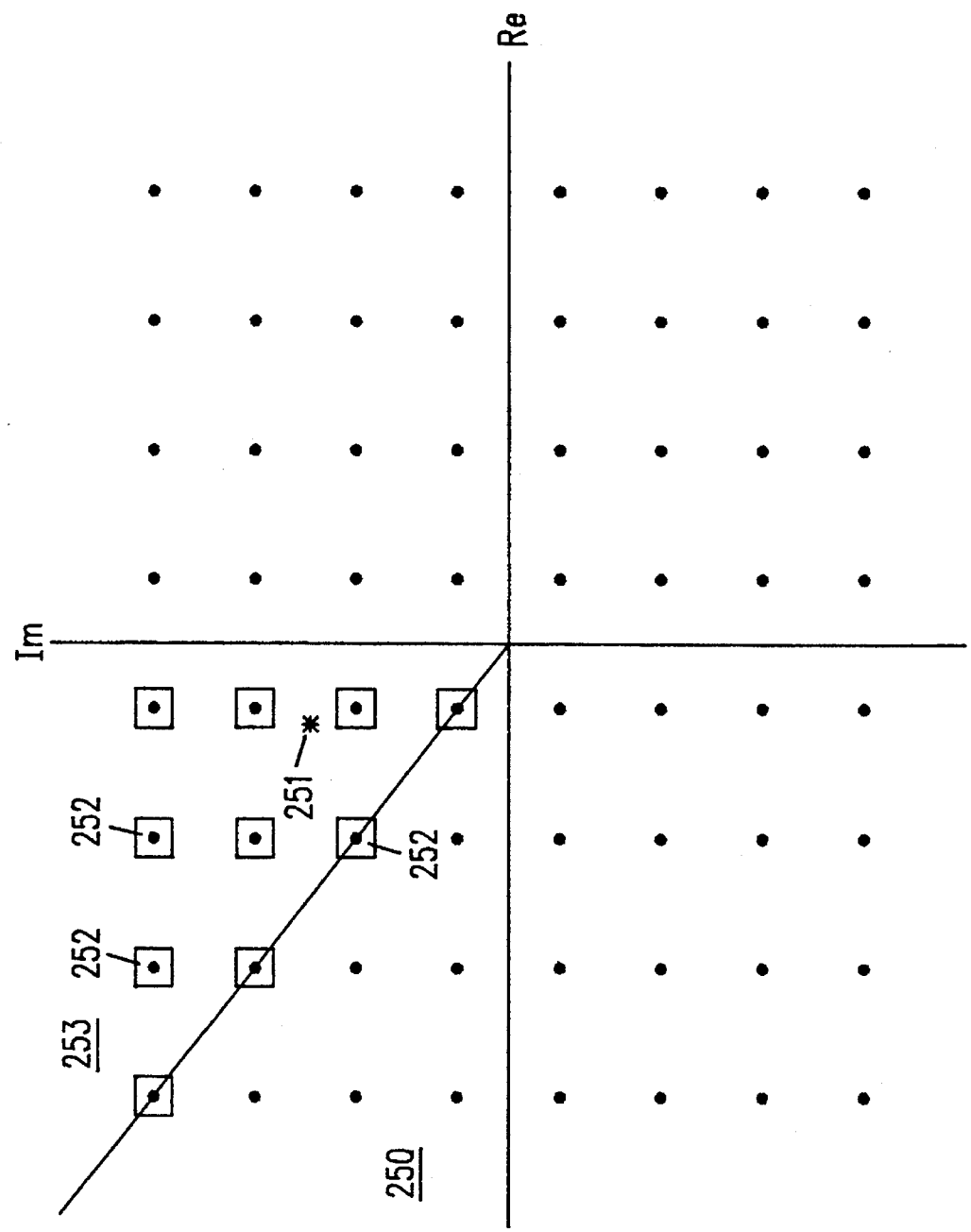
FIG. 25 illustrates a method in which the number of viable candidate constellation points are reduced to those constellation point in the same quadrant or even the same 45 degree sector of the complex plane as the sample point according to the present invention.

Squared magnitude difference: $|(x_R^2 + x_I^2) - (q_{iR}^2 + q_{iI}^2)| = ||x|^2 - |q_i|^2|$ Squared euclidean distance: $(x_R - q_{iR})^2 + (x_I - q_{iI})^2 = |x - q_i|^2$ There are many options which can be employed to perform the calculations required for the present invention. There are also several optimizations which can reduce the total number of constellation points (i) which must be considered in order to make the proper decision. The most obvious optimization involves the calculation of the euclidean distance measure for each constellation point $q_i$. Instead of calculating the distance for all constellation points $q_i$, as illustrated in FIG. 25, the number of points can be reduced by a factor of four by only considering the constellation points in the same quadrant 250 as the sample point 251. Thus, only those constellation points $q_i$ which have the same sign in both the real and imaginary parts as the sample point x are considered. The number of candidate constellation points $q_i$ can further be reduced to the points lying on or within a 45 degree subsection of the complex plane. This is illustrated in FIG. 25 for 64 QAM. Once the correct quadrant has been determined, those points having the opposite magnitude inequality relationship in the absolute values of the real and imaginary parts are compared. Thus, because of the symmetry relations, only 10 of the 64 points are viable candidates regardless of the value of $\alpha$. Those ten points 252 are shown enclosed in squares in FIG. 25. Therefore, the minimization computations can be limited to these points. At the expense of increased sophistication, the number of viable candidate constellation points 252 can be further reduced by eliminating those constellation points within the 45 degree section 253 which can never represent the appropriate decision for any value of $\alpha$.

Figure 26:
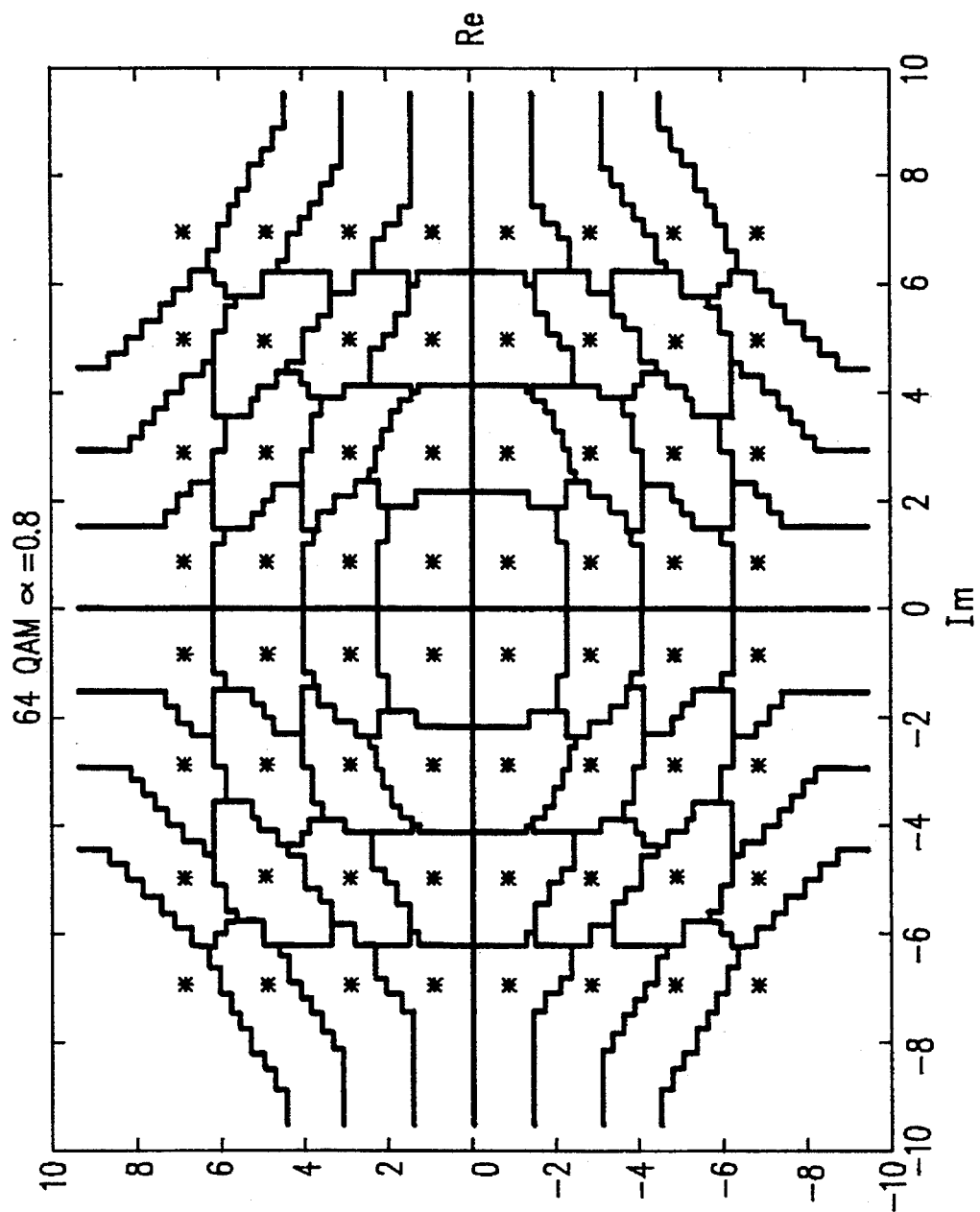
FIG. 26 illustrates decision regions for a coarsely quantized sample space having three bits of resolution between constellation points and $\alpha=0.8$ according to the present invention.

Once the number of viable candidate constellation points 252 has been narrowed down, the performance of the computations themselves can be optimized. One alternative to running the calculations for each constellation point $q_i$ is to use a lookup table. Using the lookup table approach, a set of symbols $q_i$ corresponding to the correct decision for every possible value of a must be stored for every possible sample point x. If many values for $\alpha$ are supported, and if the full resolution of the sample points x is supported, the lookup table becomes inordinately large. Quantizing the input to a reasonable level, for instance three bits extra for spacing between constellation points, and supporting three different $\alpha$ levels (0.01, 0.5, and 1.0), obtains most of the benefit of the present invention at a reasonable cost. Thus, the distance between constellation points is coarsely divided into eight regions along both the real axis and the imaginary axis. FIG. 26 shows the resulting decisions regions corresponding to $\alpha = 0.8$ with three bits spacing between constellation points. Truncating the lower N bits in this manner reduces the size of the lookup table by a factor of $2^{2N}$. Thus, if five bits of the real and imaginary parts of x were truncated to leave a three bit resolution between constellation points $q_i$, the storage requirement for producing the decision regions shown in FIG. 26 is 1024 times smaller than the storage requirement to produce the decision regions in the corresponding FIG. 24 having full resolution. Using a straight lookup table approach, the size of the lookup table is directly proportional to the number of values of $\alpha$ which are supported.

For silicon implementations the lookup table can be either a ROM (Random Access Memory), PLA (Programmable Logic Array), or synthesized gates. The synthesis procedure will result in an effective implementation because of the nonrandom nature of information. In other words, many several adjacent sample regions will result in the same decisions. Because many adjacent sample regions will produce the same decisions for several different values of $\alpha$, minterms capturing large portions of the input space can be derived for all the outputs.

In one extreme, all the calculations can be performed from scratch for each sample point. In the opposite extreme, the above-described lookup table approach can be used so that all the necessary computations have been precalculated and the final decisions are stored in the ROM.

A combination of the above two methods can also exist that balances the use of processing and storage. For example, the squared magnitude differential and the squared euclidean distance for each viable candidate point 252 can be stored for each coarsely quantized sample point region 260. The multiplication by $\alpha$ and $(1-\alpha)$ can then be performed on those retrieved quantities to derive the minimization comparison quantity for each viable candidate constellation point 252. This implementation is preferable, for example, when it is desirable for some reason to support a high resolution for $\alpha$, thus allowing many different values for $\alpha$, such that a lookup table approach would be too large because of the many possible values of $\alpha$.

While the methods and apparatuses of the present invention have been disclosed above with particular reference to the preferred and alternate embodiments, those of ordinary skill in the art will be enabled by this disclosure to recognize that the present invention may be practiced with many modifications and alterations without departing from the spirit and scope of this invention. Accordingly, the specifications and drawings are to be regarded as illustrating the present invention rather than limiting the scope of the present invention.

What is claimed is:

1. A method of determining an output constellation point corresponding to a transmitted symbol from among a rectangular array of constellation points upon receiving a sample point, the method comprising the steps of:

producing a plurality of scalars corresponding to a plurality of constellation points, such that each scalar is monotonically related to an absolute magnitude differential between the sample point and a constellation point;

identifying a subset from the plurality of constellation points, such that each scalar corresponding to the constellation points in the subset are equal and are numerically lower than all scalars corresponding to the constellation points not included in the subset; and selecting the output constellation point which is geometrically closest to the sample point from among the subset.

2. A method as in claim 1, wherein the plurality of scalars produced in the producing step is an absolute value of the differences of a squared magnitude of the constellation point and a squared magnitude of the sample point.

3. A method as in claim 2, wherein a sample space including all possible sample points is divided into a discrete number of rectangular regions less than the number of possible sample points, and wherein the producing step produces the plurality of scalars by retrieving the scalars corresponding to each of the plurality of constellation points from a storage device that stores the scalars for the plurality of constellation points for each rectangular region.

4. A method as in claim 3, wherein the storage device is a Read Only Memory.

5. A method as in claim 3, wherein the storage device is a Programmable Logic Array.

6. A method as in claim 3, wherein the storage device is an optimized network of combinational logic gates.

7. A method as in claim 2, wherein the producing step comprises the steps of:

producing squared magnitudes of each of the plurality of constellation points;

computing the squared magnitude of the sample point by squaring a real part of the sample point to produce a squared real part, squaring an imaginary part of the sample point to produce a squared imaginary part, and adding the squared real part and the squared imaginary part to produce the squared magnitude of the sample point;

computing the plurality of scalars by subtracting the squared magnitude of the sample point from the squared magnitudes of the plurality of constellation points.

8. A method as in claim 3, wherein the plurality of constellation points is limited to constellation points in the same quadrant of a complex plane as the sample point.

9. A method as in claim 3, wherein the plurality of constellation points is limited to constellation points within or on the boundaries of a 45 degree sector of a complex plane having one boundary on a real or on an imaginary axis, such that the sector contains the sample point.

10. A method as in claim 7, wherein the plurality of constellation points is limited to constellation points in the same quadrant of a complex plane as the sample point.

11. A method as in claim 7, wherein the plurality of constellation points is limited to constellation points within or on the boundaries of a 45 degree sector of a complex plane having one boundary on a real or on an imaginary axis, such that the sector contains the sample point.

12. A method of determining an output constellation point corresponding to a transmitted symbol from among a rectangular array of constellation points upon receiving a sample point, the method comprising the steps of:

producing a first plurality of first scalars corresponding to a plurality of constellation points, such that each first scalar is a first weighting factor multiplied by a first quantity monotonically related to a euclidean distance between the sample point and a constellation point;

producing a second plurality of second scalars corresponding to the plurality of constellation points, such that each second scalar is a second weighting factor multiplied by a second quantity monotonically related to an absolute magnitude differential between the sample point and a constellation point;

producing a third plurality of third scalars, such that each third scalar represents the sum of a first scalar and a second scalar corresponding to a specific constellation point;

identifying a minimum third scalar which is numerically smaller than all other third scalars; and selecting the output constellation point which corresponds to the minimum third scalar.

13. A method as in claim 12, wherein the first quantity monotonically related to the euclidean distance is the euclidean distance squared.

14. A method as in claim 13, wherein the second quantity monotonically related to an absolute magnitude differential is an absolute value of the differences of a squared magnitude of a constellation point and a squared magnitude of the sample point.

15. A method as in claim 14, wherein either the first weighting factor, the second weighting factor or both the first weighting factor and the second weighting factor are adjusted before the receipt of a sample point.

16. A method as in claim 15, wherein the sum or the first weighting factor and the second weighting factor is a constant value.

17. A method as in claim 16, wherein the constant value is one.

18. A method as in claim 15, wherein a sample space including all possible sample points is divided into a discrete number of rectangular regions less than the number of possible sample points, such that each rectangular region has at least one lookup table entry corresponding to the rectangular region in a lookup table storage device.

19. A method as in claim 18, wherein the lookup table entries corresponding to each rectangular region store a proper constellation point decision for every possible value of the first weighting factor.

20. A method as in claim 15, wherein the plurality of constellation points is limited to constellation points in the same quadrant of a complex plane as the sample point.

21. A method as in claim 15, wherein the plurality of constellation points is limited to constellation points within or on the boundaries of a 45 degree sector of a complex plane having one boundary on a real or an imaginary axis, such that the sector contains the sample point.

22. A method as in claim 18,
wherein the lookup table entries corresponding to each rectangular region include the first quantity and the second quantity corresponding to each constellation point in the plurality of constellation points,
wherein the step of producing of the first plurality of first scalars includes retrieving the plurality of first quantities from the lookup table, and
wherein the step of producing of the second plurality of second scalars includes retrieving the plurality of second quantities from the lookup table.

23. A method as in claim 18, wherein the lookup table storage device is a Read Only Memory.

24. A method as in claim 18, wherein the lookup table storage device is a Programmable Logic Array.

25. A method as in claim 18, wherein the lookup table storage device is an optimized network of combinational logic gates.

26. A method as in claim 15, wherein the first weighting factor and the second weighting factor are adjusted according to output from a carrier lock detection circuit, such that the first weighting factor is relatively larger when the carrier lock detection circuit detects lock, and such that the second weighting factor is relatively larger when the carrier lock detection circuit detects no lock.

27. A method as in claim 26, wherein there are several discrete levels for the first weighting factor and second weighting factor, such that when the carrier lock detection circuit detects lock, the second weighting factor is stepped up in increments until it reaches a maximum value.

28. A method as in claim 26, wherein the first weighting factor and second weighting factor have the same resolution as the output of the carrier lock detection circuit.

29. An apparatus for determining an output constellation point corresponding to a transmitted symbol from among a rectangular array of constellation points upon receiving a sample point, the apparatus comprising:
means for producing a plurality of scalars corresponding to a plurality of constellation points, such that each scalar is monotonically related to an absolute magnitude differential between the sample point and a constellation point;
means for identifying a subset from the plurality of constellation points, such that each scalar corresponding to the constellation points in the subset are equal and are numerically lower than all scalars corresponding to the constellation points not included in the subset; and
means for selecting the output constellation point which is geometrically closest to the sample point from among the subset.

30. An apparatus as in claim 29, wherein the plurality of scalars produced by the producing means is an absolute value of the differences of a squared magnitude of the constellation point and a squared magnitude of the sample point.

31. An apparatus as in claim 30, wherein a sample space including all possible sample points is divided into a discrete number of rectangular regions less than the number of possible sample points, and wherein the producing means produces the plurality of scalars by retrieving the scalars corresponding to each of the plurality of constellation points from a storage device that stores the scalars for the plurality of constellation points for each rectangular region.

32. An apparatus as in claim 30, wherein the producing means comprises:
means for producing squared magnitudes of each of the plurality of constellation points;
means for computing the squared magnitude of the sample point by squaring a real part of the sample point to produce a squared real part, squaring an imaginary part of the sample point to produce a squared imaginary part, and adding the squared real part and the squared imaginary part to produce the squared magnitude of the sample point;
means for computing the plurality of scalars by subtracting the squared magnitude of the sample point from the squared magnitudes of the plurality of constellation points.

33. An apparatus for determining an output constellation point corresponding to a transmitted symbol from among a rectangular array of constellation points upon receiving a sample point, the apparatus comprising:
means for producing a first plurality of first scalars corresponding to a plurality of constellation points, such that each first scalar is a first weighting factor multiplied by a first quantity monotonically related to a euclidean distance between the sample point and a constellation point;
means for producing a second plurality of second scalars corresponding to the plurality of constellation points, such that each second scalar is a second weighting factor multiplied by a second quantity monotonically related to an absolute magnitude differential between the sample point and a constellation point;
means for producing a third plurality of third scalars, such that each third scalar represents the sum of a first scalar and a second scalar corresponding to a specific constellation point;
means for identifying a minimum third scalar which is numerically smaller than all other third scalars; and
means for selecting the output constellation point which corresponds to the minimum third scalar.

34. An apparatus as in claim 33, wherein the first quantity monotonically related to the euclidean distance is the euclidean distance squared.

35. An apparatus as in claim 34, wherein the second quantity monotonically related to an absolute magnitude differential is an absolute value of the differences of a squared magnitude of a constellation point and a squared magnitude of the sample point.

36. An apparatus as in claim 35, wherein either the first weighting factor, the second weighting factor or both the first weighting factor and the second weighting factor are adjusted before the receipt of a sample point.

37. An apparatus as in claim 36, wherein a sample space including all possible sample points is divided into a discrete number of rectangular regions less than the number of possible sample points, such that each rectangular region has at least one lookup table entry corresponding to the rectangular region in a lookup table storage device.

38. An apparatus as in claim 37, wherein the lookup table entries corresponding to each rectangular region store a proper constellation point decision for every possible value of the first weighting factor.

39. An apparatus as in claim 37,
wherein the lookup table entries corresponding to each rectangular region include the first quantity and the second quantity corresponding to each constellation point in the plurality of constellation points,
wherein the means for producing of the first plurality of first scalars includes means for retrieving the plurality of first quantities from the lookup table, and
wherein the means of producing of the second plurality of second scalars includes means for retrieving the plurality of second quantities from the lookup table.

40. An apparatus as in claim 36, wherein the first weighting factor and the second weighting factor are adjusted according to output from a carrier lock detection circuit, such that the first weighting factor is relatively larger when the carrier lock detection circuit detects lock, and such that the second weighting factor is relatively larger when the carrier lock detection circuit detects no lock.

41. An apparatus as in claim 40, wherein there are several discrete levels for the first weighting factor and second weighting factor, such that when the carrier lock detection circuit detects lock, the second weighting factor is stepped up in increments until it reaches a maximum value.

42. An apparatus as in claim 40, wherein the first weighting factor and second weighting factor have the same resolution as the output of the carrier lock detection circuit.

* * * * *